(12) United States Patent
Dey

(10) Patent No.: US 9,562,382 B2
(45) Date of Patent: Feb. 7, 2017

(54) VEHICLE DOOR HINGE STRUCTURE

(71) Applicant: Nissan North America, Inc., Franklin, TN (US)

(72) Inventor: Debraj Dey, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/734,827

(22) Filed: Jun. 9, 2015

(65) Prior Publication Data

US 2016/0362920 A1    Dec. 15, 2016

(51) Int. Cl.
*B60J 5/04* (2006.01)
*E05D 11/10* (2006.01)
*E05D 3/12* (2006.01)

(52) U.S. Cl.
CPC .......... *E05D 11/1014* (2013.01); *B60J 5/0468* (2013.01); *E05D 3/127* (2013.01)

(58) Field of Classification Search
CPC ........ E05D 3/14; E05D 3/127; E05D 11/1007; E05D 11/1014; B60J 5/047; B60J 5/0468; Y10T 16/5402; Y10T 16/628; Y10T 16/6285; Y10T 16/27
USPC .................................... 296/146.12
See application file for complete search history.

(56) References Cited

U.S. PATENT DOCUMENTS

| | | | |
|---|---|---|---|
| 4,700,984 A | 10/1987 | Kinaga et al. | |
| 4,713,862 A | 12/1987 | Kinaga et al. | |
| 5,491,875 A * | 2/1996 | Siladke | B60J 5/0479 16/346 |
| 5,632,065 A | 5/1997 | Siladke et al. | |
| 6,175,991 B1 | 1/2001 | Driesman et al. | |
| 6,334,236 B1 | 1/2002 | Kalliomaki | |
| 6,386,621 B1 * | 5/2002 | Kozak | B60J 5/047 16/278 |
| 6,550,845 B1 | 4/2003 | Pietryga | |
| 6,629,337 B2 | 10/2003 | Nania | |
| 6,701,576 B2 | 3/2004 | Michalak | |
| 6,817,063 B1 | 11/2004 | Nania | |
| 6,942,277 B2 | 9/2005 | Rangnekar et al. | |

(Continued)

FOREIGN PATENT DOCUMENTS

| | | |
|---|---|---|
| CN | 201666062 U | 12/2010 |
| DE | 20221632 U1 | 1/2007 |

(Continued)

*Primary Examiner* — Gregory Blankenship
(74) *Attorney, Agent, or Firm* — Global IP Counselors, LLP

(57) ABSTRACT

A vehicle door hinge structure includes a first bracket, a second bracket, a hinge arm and a compressible check structure. The hinge arm has a first end that s attached to the first bracket for pivoting movement about a first pivot axis. The second bracket is attached to a second end of the hinge arm for pivoting movement about a second pivot axis. The compressible check structure is fixed in position to the first bracket. The compressible check structure is adjacent to and spaced apart from a stop surface of the first bracket. The compressible check structure extends upward away from a surface of the first bracket in an uncompressed state. However, a movement limiting surface of the hinge arm contacts and compresses the compressible check structure during a portion of movement of the hinge arm.

20 Claims, 18 Drawing Sheets

(56) References Cited

U.S. PATENT DOCUMENTS

| | | | |
|---|---|---|---|
| 6,997,504 B1* | 2/2006 | Lang | E05D 3/127 |
| | | | 16/334 |
| 7,032,953 B2 | 4/2006 | Rangnekar et al. | |
| 7,103,938 B2 | 9/2006 | Bruckner et al. | |
| 7,150,492 B2 | 12/2006 | Nania | |
| 7,383,614 B2* | 6/2008 | Matsuki | E05C 17/206 |
| | | | 16/82 |
| RE41,143 E | 2/2010 | Rangnekar et al. | |
| 7,716,787 B2 | 5/2010 | Duning et al. | |
| 7,950,109 B2* | 5/2011 | Elliott | E05D 3/127 |
| | | | 16/334 |
| 7,980,621 B2 | 7/2011 | Elliot et al. | |
| 8,007,026 B2 | 8/2011 | Scott et al. | |
| 8,108,969 B2 | 2/2012 | Ochiai | |
| 2005/0212325 A1* | 9/2005 | Rangnekar | E05D 3/127 |
| | | | 296/146.12 |
| 2009/0293228 A1 | 12/2009 | Sasa | |
| 2010/0018004 A1 | 1/2010 | Ochiai et al. | |
| 2010/0301631 A1* | 12/2010 | Scott | E05D 3/127 |
| | | | 296/146.12 |
| 2012/0324795 A1 | 12/2012 | Krajenke et al. | |
| 2013/0119698 A1* | 5/2013 | Patzer | E05D 5/062 |
| | | | 296/146.12 |
| 2016/0145922 A1* | 5/2016 | Wickliffe | E05D 11/1042 |
| | | | 296/146.12 |

FOREIGN PATENT DOCUMENTS

| | | |
|---|---|---|
| DE | 102008061854 A1 | 6/2010 |
| JP | 2006-225927 A | 8/2006 |

* cited by examiner

VEHICLE DOOR HINGE STRUCTURE

FIELD OF THE INVENTION

The present invention generally relates to a vehicle door hinge structure. More specifically, the present invention relates to a check structure that retains a vehicle door in a fully open position.

BACKGROUND INFORMATION

A vehicle door can include a check structure that assists in retaining the door in one or more open positions after the door is moved from a closed position to an open position. Typically, the check structure includes a movement restricting mechanism that applies a force on the door to keep the door in one or more predetermined positions when opened. However, such check structures are not usually effective in all circumstances, such as when the vehicle is parked on a hill where the force of gravity can sometimes be sufficient to overcome the force of the check structure, thereby urging the door back to the closed position.

SUMMARY

One object of the disclosure is to provide a vehicle door with a check structure that retains the vehicle door in an open position with sufficient force such that the vehicle door can only be moved out of the open position by a predetermined level of force, such as force applied by a vehicle operator to the vehicle door.

In view of the state of the known technology, one aspect of the present disclosure is to provide a vehicle door hinge structure with a first bracket, a hinge arm, a second bracket and a compressible check structure. The first bracket has a first surface that extends in a first direction and a stop surface extends in a second direction transverse to the first direction. The hinge arm has a first end, a second end and a body portion extending from the first end to the second end. The first end is attached to the first bracket for pivoting movement about a first pivot axis that extends through the first surface of the first bracket such that the hinge arm pivots relative to the first bracket from a first position to a second position. The body portion of the hinge arm has a movement limiting surface that is spaced apart from the first surface by a first predetermined distance. The second bracket is attached to the second end of the hinge arm for pivoting movement about a second pivot axis that extends through the second bracket and the second end of the hinge arm. The second bracket pivots relative to the second end of the hinge arm. The compressible check structure is fixed in position along a portion of the first surface of the first bracket. The compressible check structure is adjacent to and spaced apart from the stop surface of the first bracket. The compressible check structure extends away from the first surface in an uncompressed state by a second predetermined distance that is greater than the first predetermined distance. The movement limiting surface the hinge arm contacts and compresses the compressible check structure during a portion of movement of the hinge arm between the first position and the second position.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
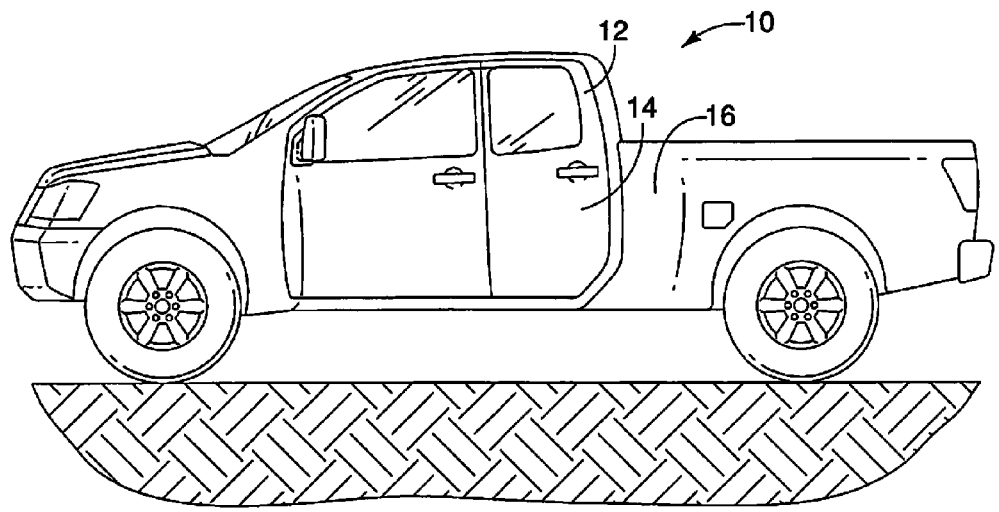
FIG. 1 is a side view of a vehicle showing a door in a closed position, the door being supported by a hinge structure that includes a check structure in accordance with a first embodiment.
Figure 2:
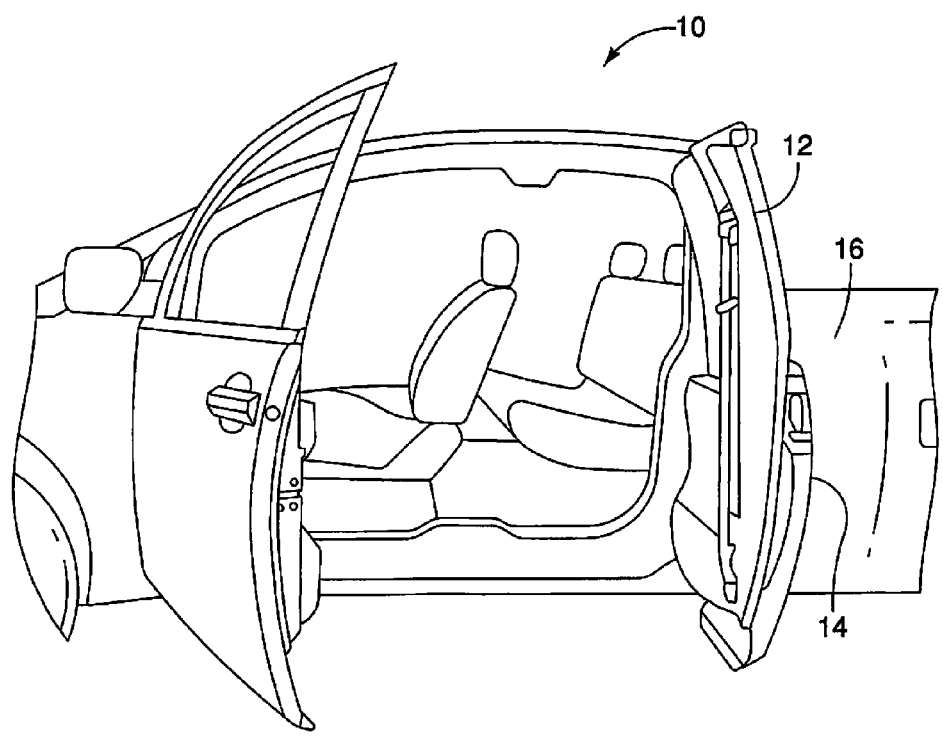
FIG. 2 is another side view of the vehicle showing the door in an intermediate open position in accordance with the first embodiment.
Figure 3:
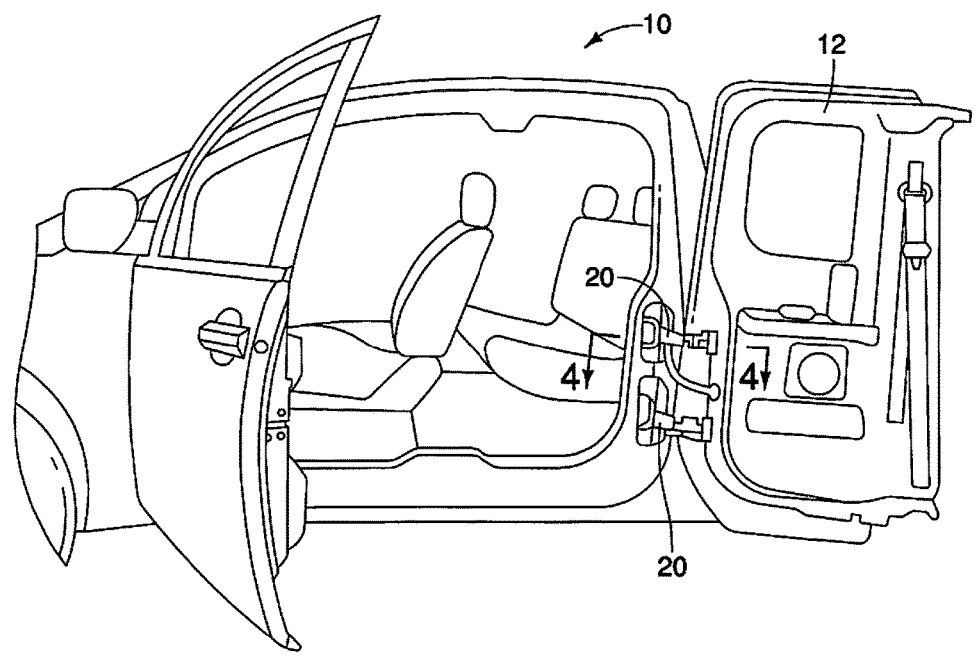
FIG. 3 is another side view of the vehicle similar to FIG. 2 showing the door in a fully open position exposing the hinge structure in accordance with the first embodiment.

Referring initially to FIG. 1-3, a vehicle 10 that includes a door 12 and a door opening 13. The door 12 is configured to open, exposing the door opening 13, and close, covering the door opening 13. The door 12 is further configured such that, in a closed position, an outer surface 14 of the door 12 conforms to and aligns with an outer surface 16 of the vehicle 10, as shown in FIG. 1. In a fully open position, the outer surface 14 of the door 12 faces and overlays a portion of the outer surface 16 of the vehicle 10, as shown in FIG. 3. FIG. 2 shows the door 12 in an intermediate position and FIG. 3 shows the door 12 in a fully open position, with the outer surface 14 of the door 12 overlaying and covering a portion of the outer surface 16 of the vehicle 10.

The vehicle 10 is depicted as a pickup truck having a plurality of doors. However, it should be understood from the drawings and the description below, that the vehicle 10 can be any of a variety of vehicles, such as a van, a sports utility vehicle, a commercial van or a passenger vehicle such as a sedan or a coupe. Further the door 12 can be a front door, rear door, back door or any hinged door of such vehicles and is not limited to the back door depicted in FIG. 1-3. More specifically, the hinge structures described herein below, can be used on any vehicle closure panel that pivots about an axis between a closed position and an open position.

Figure 4:
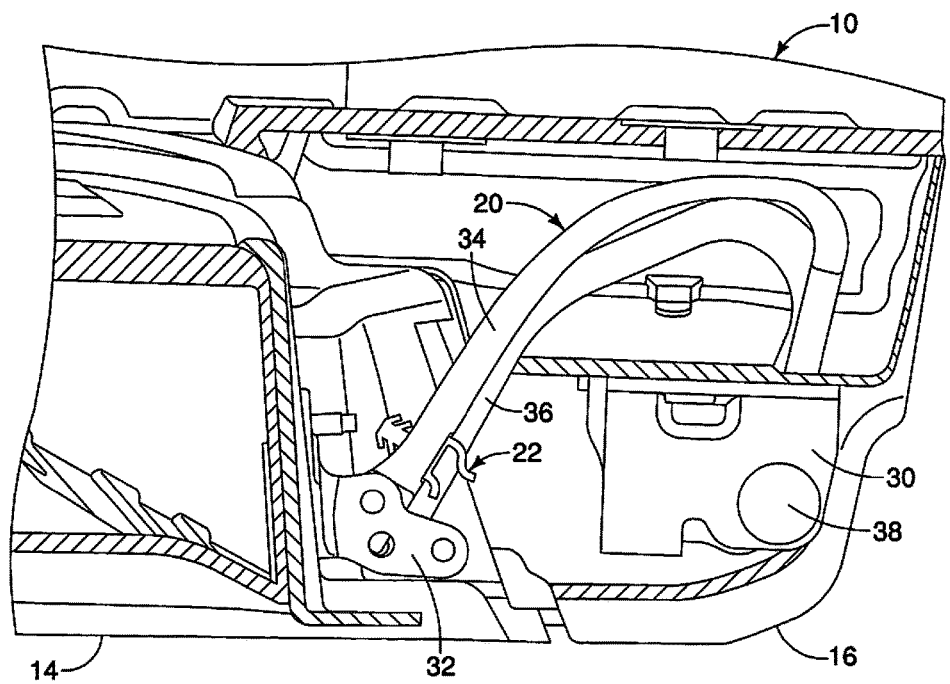
FIG. 4 is a cross-sectional view of a portion the vehicle taken along the line 4-4 in FIG. 3, showing the hinge structure attached to the vehicle and to the door in accordance with the first embodiment.

As shown in FIGS. 3 and 4, the door 12 is supported to the vehicle 10 for pivoting movement by hinge structures 20. As shown in FIG. 3, there can be two hinge structures 20 supporting the door 12. FIG. 4 is a top view of one of the hinge structures 20, described in greater detail below. The hinge structure 20 is configured allow the door 12 to move along an arcuate path between the fully open position and the closed position with an angular movement range of approximately 170 degrees. The hinge structure 20 includes a check structure 22 that restricts movement of the door 12 when the door 12 is moved to the fully open position, as is described in greater detail below. In the depicted embodiment, only one of the hinge structures 20 includes the check structure 22 in a manner described further below. However, it should be understood from the drawings and the description herein that both hinge structures 20 can be equipped with the check structure 22.

Before describing the check structure 22, a description of one of the hinge structures 20 is provided with specific reference to FIGS. 3-11. Since the hinge structures 20 are basically the same, description of only one of the hinge structures 20 is included for the sake of brevity.

Figure 5:
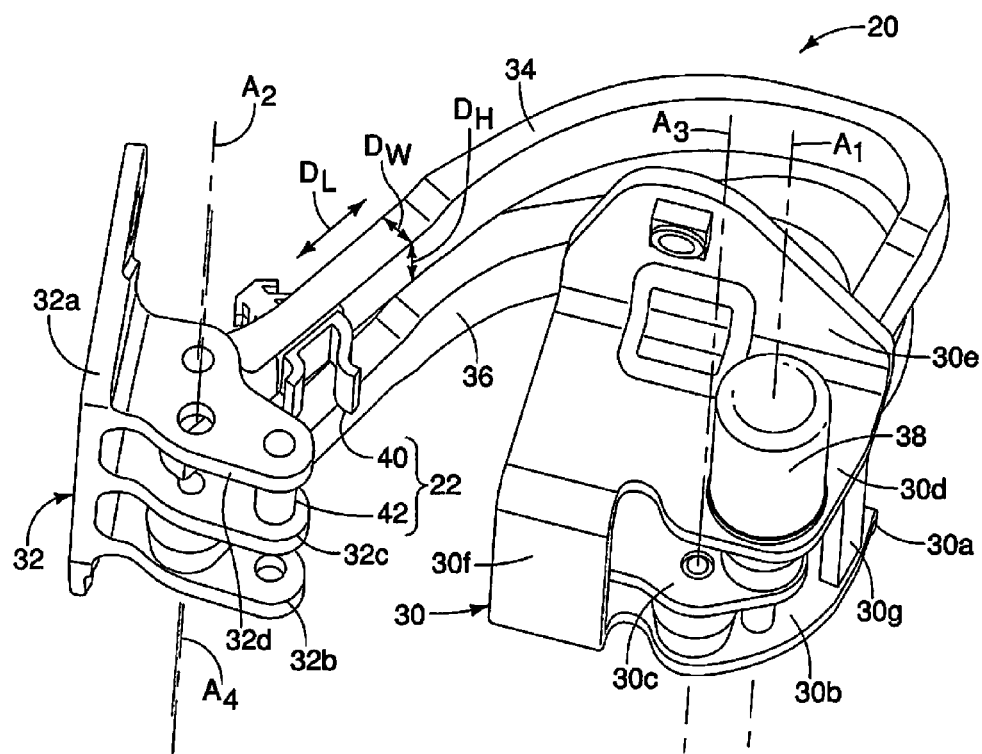
FIG. 5 is perspective view of the hinge structure removed from the vehicle showing a body bracket, a first hinge arm, a second hinge arm, a door bracket and the check structure in accordance with the first embodiment.
Figure 6:
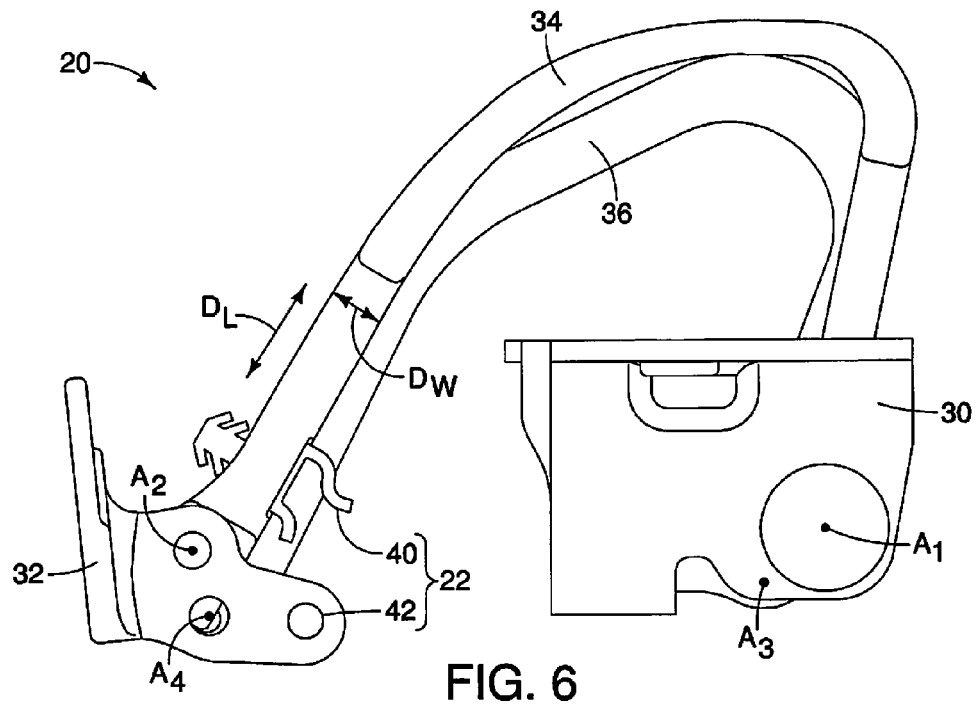
FIG. 6 is a top view of the hinge structure with the body bracket, the first and second hinge arms and the door bracket shown in a closed position corresponding to the position of the door as shown in FIG. 1, in accordance with the first embodiment.
Figure 7:
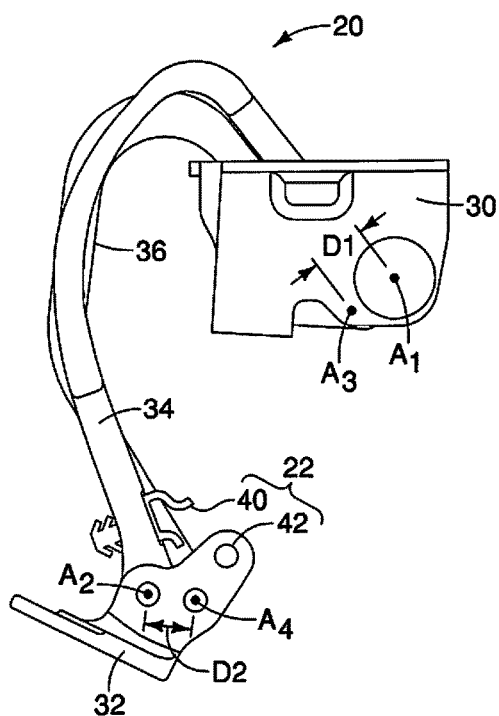
FIG. 7 is another top view of the hinge structure with the body bracket, the first and second hinge arms and the door bracket shown in an intermediate position, in accordance with the first embodiment.
Figure 8:
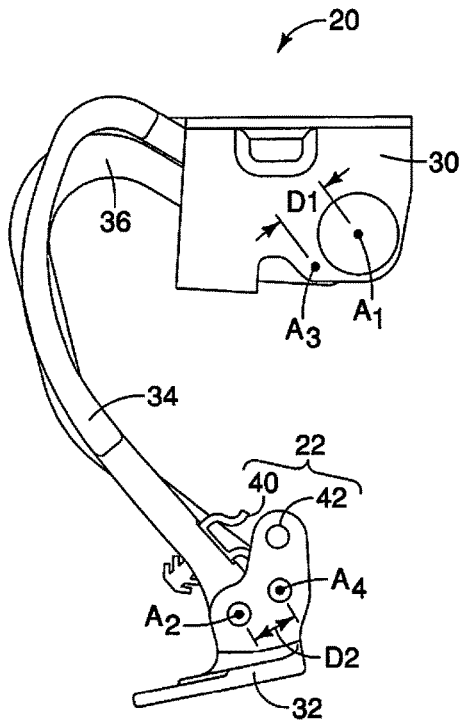
FIG. 8 is yet another top view of the hinge structure with the body bracket, the first and second hinge arms and the door bracket shown in the intermediate position corresponding to the position of the door as shown in FIG. 2, in accordance with the first embodiment.

As shown in FIG. 5, the hinge structure 20 includes a body bracket 30, a door bracket 32, a first hinge arm 34, a second hinge arm 36, an optional primary check structure 38 and the check structure 22. As shown in FIGS. 5 and 6, the first hinge arm 34 defines a lengthwise direction $D_L$, a widthwise direction $D_W$ and a height-wise direction $D_H$ (FIG. 5 only).

The body bracket 30 includes lower attachment flange 30a, lower plate 30b, a mid-plate 30c, a top plate 30d and an upper flange 30e. The lower attachment flange 30a and the upper attachment flange 30e are configured to receive mechanical fasteners for the purpose of securely attaching the body bracket 30 to the vehicle 10. Alternatively, the body bracket 30 can be welded to the vehicle 10. In FIGS. 3 and 4, the body bracket 30 is shown fixedly attached to a pillar structure of the vehicle 10 in a conventional manner. When installed to the vehicle 10, the lower attachment flange 30a and the upper attachment flange 30e are upright and extend in a vertical direction.

The lower plate 30b, the mid-plate 30c and the top plate 30d are all horizontally oriented and are preferably parallel to one another. The lower plate 30b, the mid-plate 30c and the top plate 30d are all rigidly connected to one another via support portions 30f and 30g of the body bracket 30, as shown in FIG. 5.

The lower attachment flange 30a, the lower plate 30b, the mid-plate 30c, the top plate 30d, the upper flange 30e and support portions 30f and 30g are preferably made of a metallic material such as hardened steel but can alternatively be made of other metal materials. Combinations of the lower attachment flange 30a, the lower plate 30b, the mid-plate 30c, the top plate 30d, the upper flange 30e and support portions 30f and 30g can be stamped from a single sheet of metal with remaining portions being welded in place as shown in FIG. 5.

The door bracket 32 includes a main portion 32a, a lower plate 32b, a mid-plate 32c and an upper plate 32d. The main portion 32a is a generally flat portion of the door bracket 32 and is configured to receive mechanical fasteners for the purpose of securely attaching the door bracket 32 to the door 12. Alternatively, the door bracket 32 can be welded to the door 12. In FIGS. 3 and 4, the door bracket 32 is shown fixedly attached to the door 12 of the vehicle 10 in a conventional manner. When installed to door 12 of the vehicle 10, the main portion 32a is upright and extends in a vertical direction.

The lower plate 32b, the mid-plate 32c and the upper plate 32d are all horizontally extending portions of the door bracket 32 with the door bracket 32 installed to the door 12 and the door 12 installed to the vehicle 10. The lower plate 32b, the mid-plate 32c and the upper plate 32d are fixedly attached to the main portion 32a. More specifically, the lower plate 32b, the mid-plate 32c and the upper plate 32d can be unitarily formed with the main portion 32a or can be welded thereto. The lower plate 32b, the mid-plate 32c and the upper plate 32d are spaced apart from one another.

The door bracket 32 is preferably made of a metallic material such as hardened steel but can alternatively be made of other metal materials.

The first hinge arm 34 has a curved or gooseneck shape and is also referred to herein below as a gooseneck member. The first hinge arm 34 is shaped such that with respective pivoting ranges relative to the body bracket 30 and the door bracket 32, the first hinge arm 34 provides the door 12 with freedom to move from the closed position (FIG. 1) to the fully open position with a pivoting range of approximately 170 degrees, as is described in greater detail below.

Figure 12:
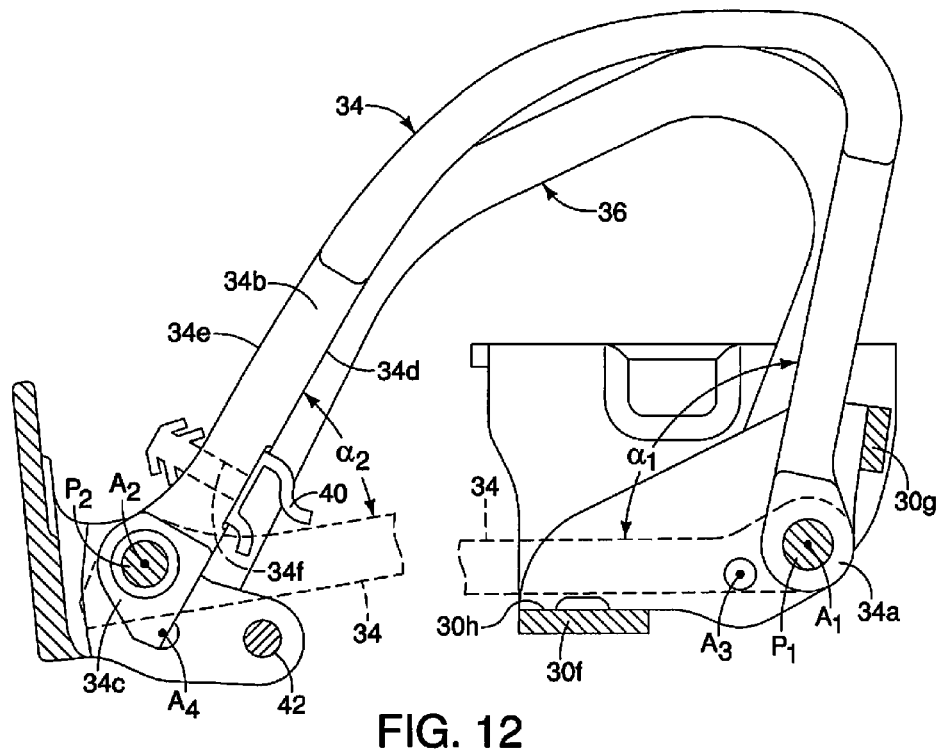
FIG. 12 is another cross-sectional view of a portion of the hinge structure taken along the line 12-12 in FIG. 10, showing a pivot axis about which the first hinge arm pivots relative to the body bracket and a pivot axis about which the door bracket pivots relative to the first hinge arm in accordance with the first embodiment.

As shown in FIG. 12, the first hinge arm 34 has a first end 34a, a main section 34b and a second end 34c. The first end 34a is attached to the body bracket 30 for pivoting movement about a first pivot axis $A_1$. The first pivot axis $A_1$ extends through the body bracket 30 such that the first hinge arm 34 pivots relative to the body bracket 30 with a pivoting range represented by an angle $\alpha_1$. The first pivot axis $A_1$ is defined by a pivot pin $P_1$. The pivot pin $P_1$ extends through apertures formed in the mid-plate 30c and the top plate 30d. Specifically, the pivot pin $P_1$ extends through the mid-plate 30c and the top plate 30d and is restrained against movement in an axial direction by, for example, fasteners or C-clips (not shown) in a conventional manner. As shown in FIG. 12, the pivoting range represented by the angle $\alpha_1$ is approximately 100 degrees.

The second end 34c of the first hinge arm 34 is attached to the door bracket 32 for pivoting movement about a second pivot axis $A_2$. The second pivot axis $A_2$ extends through the door bracket 32 such that the first hinge arm 34 pivots relative to the door bracket 32 with a pivoting range represented by an angle $\alpha_2$. The second pivot axis $A_2$ is defined by a pivot pin $P_2$. The pivot pin $P_2$ extends through apertures formed in the mid-plate 32c and the upper plate 32d. Specifically, the pivot pin $P_1$ extends through the mid-plate 30c and the top plate 32d and is restrained against movement in an axial direction by, for example, fasteners or C-clips (not shown) in a conventional manner. As shown in FIG. 12, the pivoting range represented by the angle $\alpha_2$ is approximately 70 degrees. The actual pivoting ranges represented by the angles $\alpha_1$ and $\alpha_2$ can vary from vehicle to vehicle and hinge structure to hinge structure. However, in the depicted embodiment of the hinge structure 20, the angles $\alpha_1$ and $\alpha_2$ when combined provide the hinge structure 20 and the door 12 with an overall pivoting range of approximately 170 degrees from the closed position of the door 12 to the open position of the door 12.

Figure 13:
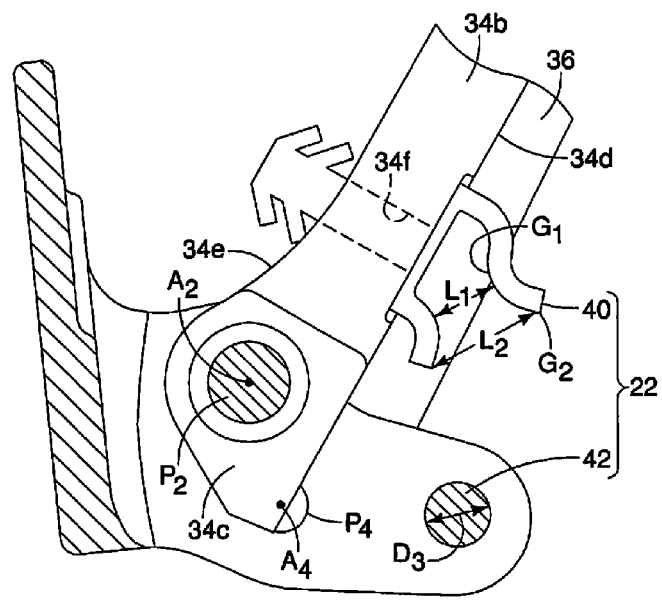
FIG. 13 is another cross-sectional view of the hinge structure showing a portion of the hinge structure depicted in FIG. 12 showing details of the check structure including a clip member and a bracket pin in accordance with the first embodiment.
Figure 14:
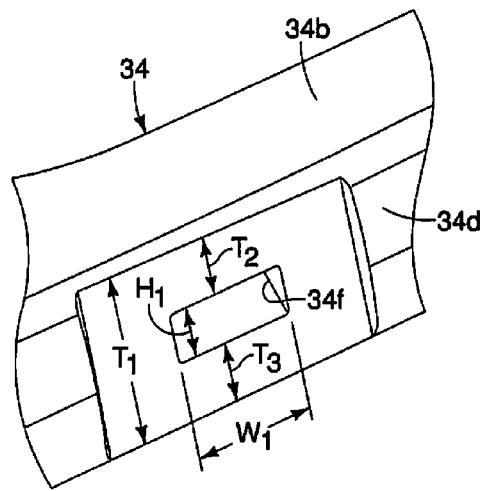
FIG. 14 is a perspective view of a portion of the first hinge arm showing a clip aperture dimensioned to receive a portion of the clip member in accordance with the first embodiment.

As shown in FIG. 13, the main section 34b of the first hinge arm 34 has a first side 34d and a second side 34e. In the first embodiment, the main section 34b includes a clip aperture 34f that extends from the first side 34d to the second side 34e. Specifically, the clip aperture 34f extends in the widthwise direction $D_W$ of the first hinge arm 34. The clip aperture 34f is located proximate the second end 34c of the first hinge arm 34. As shown in FIG. 14, the clip aperture 34f has a first height $H_1$ in a vertical direction (relative to the vehicle 10). The main section 34b of the first hinge arm 34 has an overall thickness $T_1$ in the vertical direction that is several times the size of the first height $H_1$. Specifically, the overall thickness $T_1$ is more than twice the size of the first height $H_1$. Further, the clip aperture 34f is centrally located relative to the overall thickness $T_1$ of the first hinge arm 34. Above the clip aperture 34f, the adjacent portion of the main section 34b of the first hinge arm 34 has a thickness $T_2$ and below the clip aperture 34f, the adjacent portion of the main section 34b of the first hinge arm 34 has a thickness $T_3$. In the depicted embodiment, the thickness $T_2$ is equal to the thickness 13. Further, in the depicted embodiment each of the thicknesses $T_2$ and $T_3$ is equal to or greater than the first height $H_1$ of the clip aperture 34f. The clip aperture 34f also has a width $W_1$, as shown in FIG. 14.

The second hinge arm 36 has a curved or gooseneck shape similar to the first hinge arm 34, and is also referred to herein below as a gooseneck member. The second hinge arm 36 is shaped such that with respective pivoting ranges relative to the body bracket 30 and the door bracket 32, the first hinge arm 34 and the second hinge arm 36 provide the door 12 with freedom to move from the closed position (FIG. 1) to the fully open position with a pivoting range of approximately 170 degrees, as is described in greater detail below.

Figure 11:
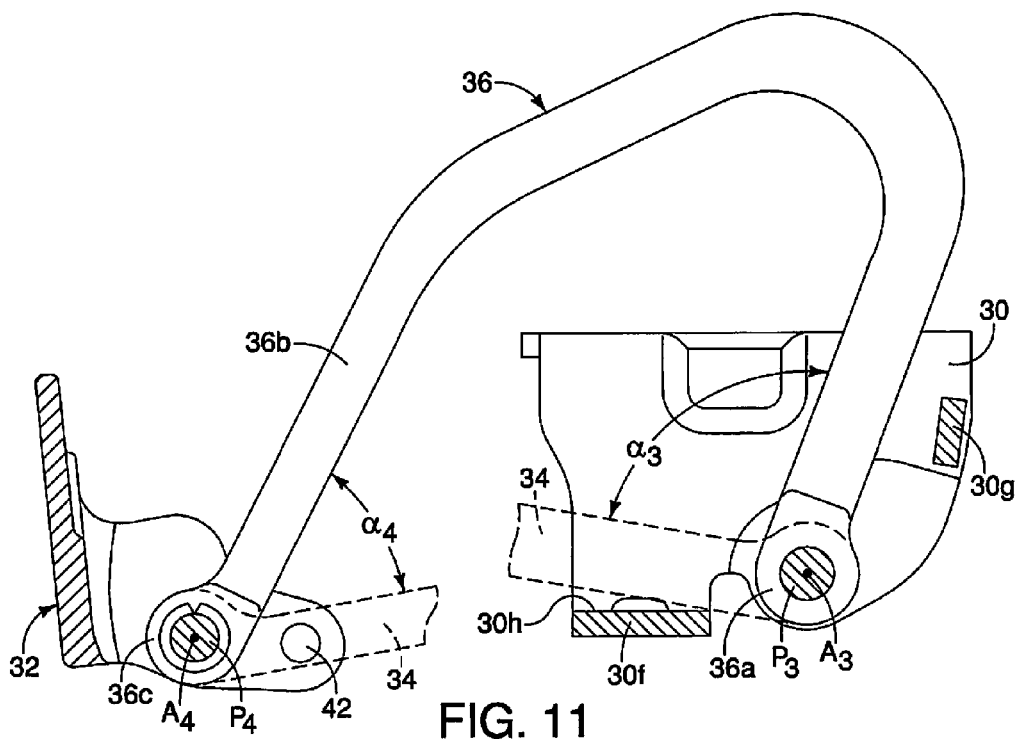
FIG. 11 is a cross-sectional view of a portion of the hinge structure taken along the line 11-11 in FIG. 10, showing a pivot axis about which the second hinge arm pivots relative to the body bracket and a pivot axis about which the door bracket pivots relative to the second hinge arm in accordance with the first embodiment.

As shown in FIG. 11, second hinge arm 36 has a first end 36a, a main section 36b and a second end 36c. The first end 36a is attached to the body bracket 30 for pivoting movement about a third pivot axis $A_3$. The third pivot axis $A_3$ extends through the body bracket 30 such that the second hinge arm 36 pivots relative to the body bracket 30 with a pivoting range represented by an angle $\alpha_3$. The third pivot axis $A_3$ is defined by a pivot pin $P_3$. The pivot pin $P_3$ extends through apertures formed in the lower plate 30b and the mid-plate 30c. Specifically, the pivot pin $P_3$ extends through the lower plate 30b and the mid-plate 30c and is restrained against movement in an axial direction by, for example, fasteners or C-clips (not shown) in a conventional manner. As shown in FIG. 11, the pivoting range represented by the angle $\alpha_3$ is approximately 100 degrees.

The second end 36c of the second hinge arm 36 is attached to the door bracket 32 for pivoting movement about a fourth pivot axis $A_4$. The fourth pivot axis $A_4$ extends through the door bracket 32 such that the second hinge arm 36 pivots relative to the body bracket 30 with a pivoting range represented by an angle $\alpha_4$. The fourth pivot axis $A_4$ is defined by a pivot pin $P_4$. The pivot pin $P_4$ extends through apertures formed in the lower plate 32b and mid-plate 32c. Specifically, the pivot pin $P_4$ extends through the lower plate 32b and mid-plate 32c and is restrained against movement in an axial direction by, for example, fasteners or C-clips (not shown) in a conventional manner. As shown in FIG. 11, the pivoting range represented by the angle $\alpha_4$ is approximately 70 degrees. The actual pivoting ranges represented by the angles $\alpha_3$ and $\alpha_4$ can vary from vehicle to vehicle and hinge structure to hinge structure. However, in the depicted embodiment of the hinge structure 20, the angles $\alpha_3$ and $\alpha_4$ when combined provide the hinge structure 20 and the door 12 with an overall pivoting range of approximately 170 degrees from the closed position of the door 12 to the open position of the door 12.

As is shown in FIGS. 6-9, the first hinge arm 34 and the second hinge arm 36 have similar overall shapes and curvatures, with slight differences. Specifically, the first pivot axis $A_1$ and third pivot axis $A_3$ are spaced apart from one another and the second pivot axis $A_2$ and fourth pivot axis $A_4$ are spaced apart from one another. All four pivot axes $A_1$, $A_2$, $A_3$ and $A_4$ are parallel to one another. A first distance $D_1$ is defined between the first pivot axis $A_1$ and the third pivot axis $A_3$ and a second distance $D_2$ is defined between the second and fourth pivot axis $A_2$ and $A_4$. The first distance $D_1$ is greater than the second distance $D_2$.

Figure 9:
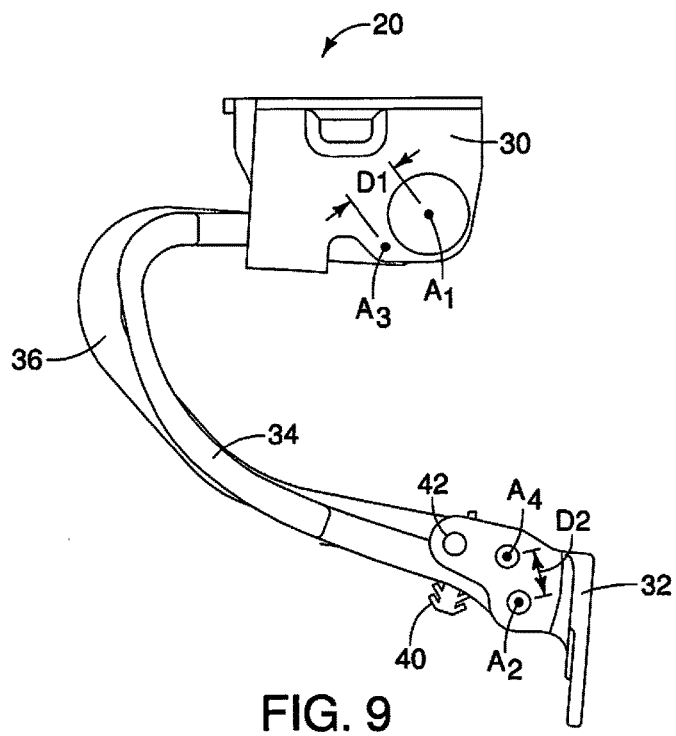
FIG. 9 is still another top view of the hinge structure with the body bracket, the first and second hinge arms and the door bracket shown in the fully open position corresponding to the position of the door as shown in FIG. 3, in accordance with the first embodiment.
Figure 10:
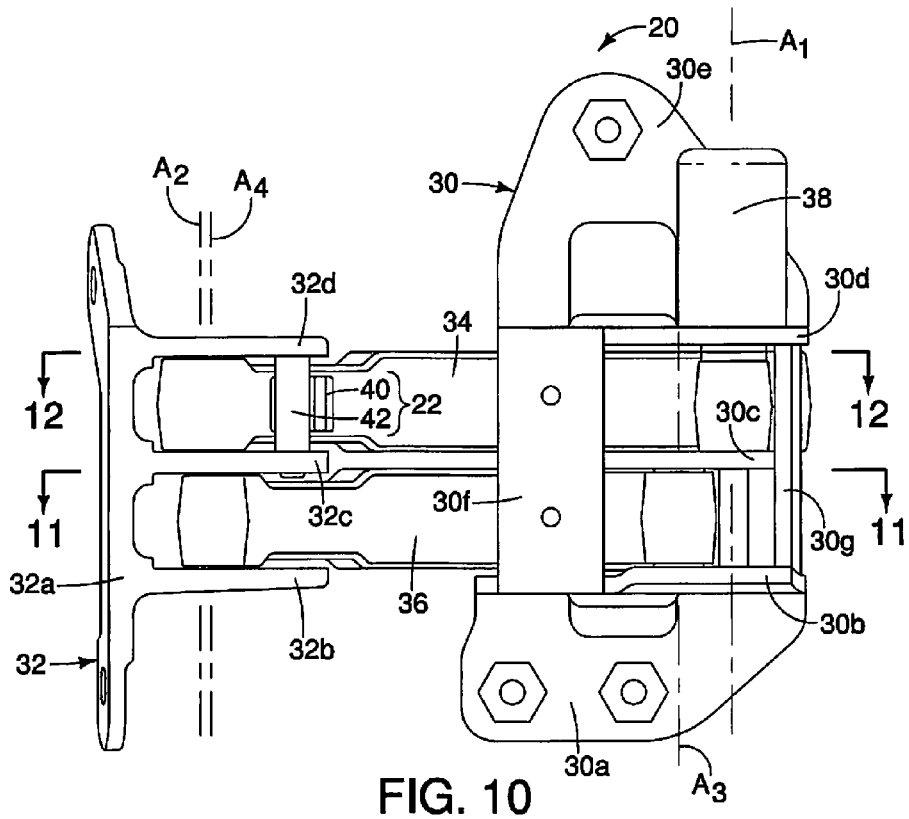
FIG. 10 is a side view of the hinge structure shown in the closed position corresponding to the depiction in FIG. 6 in accordance with the first embodiment.

The geometry of the first hinge arm 34 and the second hinge arm 36 and their respective pivot axes is such that with the hinge structure 20 in the orientation shown in FIG. 6 (corresponding to the door 12 being in the closed position in FIG. 1) the main portion 32a of the door bracket 32 is close to or approximately perpendicular to the lower and upper attachment flanges 30a and 30e of the body bracket 30. As the door 12 is opened moving the door bracket 32 toward the position shown in FIG. 7 and then FIG. 8 (corresponding approximately to the intermediate position of the door 12 in FIG. 2), the main portion 32a of the door bracket 32 become approximately parallel to the lower and upper attachment flanges 30a and 30e of the body bracket 30. Finally, as shown in FIG. 9 (corresponding to the door 12 being fully opened as shown in FIG. 3) the main portion 32a of the door bracket 32 is again approximately perpendicular to the lower and upper attachment flanges 30a and 30e of the body bracket 30, but is rotated approximately 170 degrees from the orientation depicted in FIG. 6.

The optional primary check structure 38 is mechanism that permits the hinge structure 20 the door 12 to open and close. The optional primary check structure 38 is further configured and structured with a spring loaded mechanism that serves to provide resistance to movement of the door 12 with the door in at least one open position and optionally several open positions. The optional primary check structure 38 includes a shaft (not shown) that is attached to the pivot pin $P_1$ and a housing fixed to the body bracket 30. One example of the optional primary check structure 38 is disclosed in, for example, U.S. Pat. No. 7,103,938, issued Sep. 26, 2006 to Bruckner et al., and is incorporated herein by reference. The optional primary check structure 38 is not required with the hinge structure 20 and is purely optional.

The optional primary check structure 38 serves as one means for retaining the door 12 in at least one open position. However, when the door 12 is fully open, as is shown in FIG. 3, additional means for retaining the door 12 in the fully open position may be necessary under certain circumstances, such as parking on a hill, or in windy conditions where external forces may urge the door 12 into moving from the fully open position (FIG. 3) to the closed position (FIG. 1).

Consequently, the check structure 22 is provided on the hinge structure 20 in order to maintain the door 12 in the fully open position in any of a variety of circumstances. The check structure 22 is a structure that restricts movement of the hinge structure 20 and the door 12 when the door 12 is in the fully open position as shown in FIG. 3. When the door 12 is in the fully open position shown in FIG. 3, the hinge structure 20 is oriented as shown in FIG. 9. As is described in greater detail below, in order to move the door 12 to the fully open position, a vehicle operator must use a predetermined level of force in order to put the door 12 in the fully open position. Similarly, the vehicle operator must use approximately the same predetermined level of force in order to move the door 12 away from the fully open position (FIG. 3) to any other position of the door 12, such as the intermediate position of the door 12 shown in FIG. 2.

Figure 15:
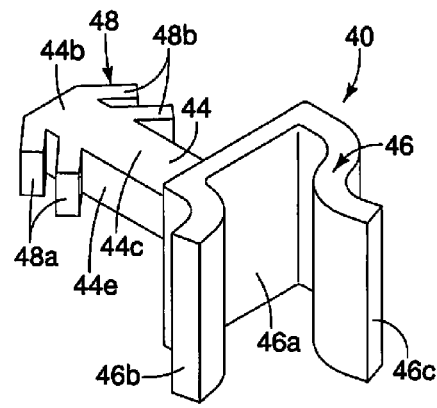
FIG. 15 is a perspective view of the clip member shown removed from the hinge structure in accordance with the first embodiment.
Figure 16:
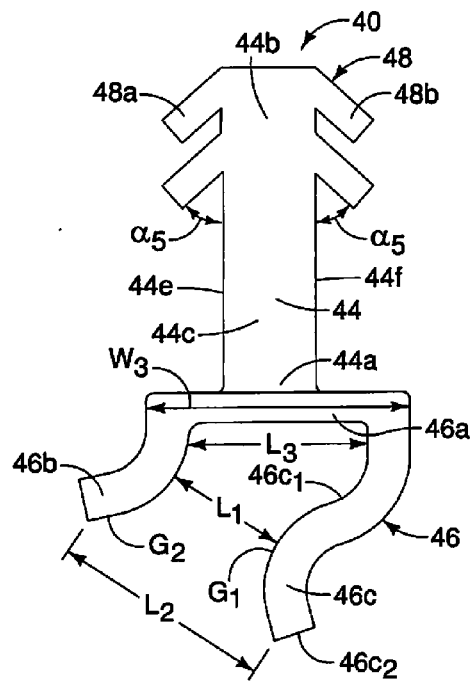
FIG. 16 is a top view of the clip member shown removed from the hinge structure in accordance with the first embodiment.
Figure 17:
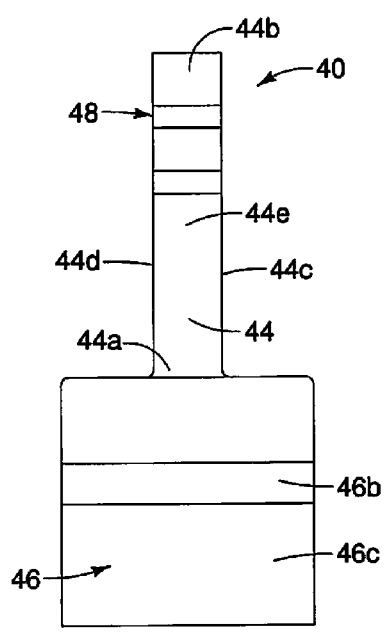
FIG. 17 is a side view of the clip member shown removed from the hinge structure in accordance with the first embodiment.
Figure 18:
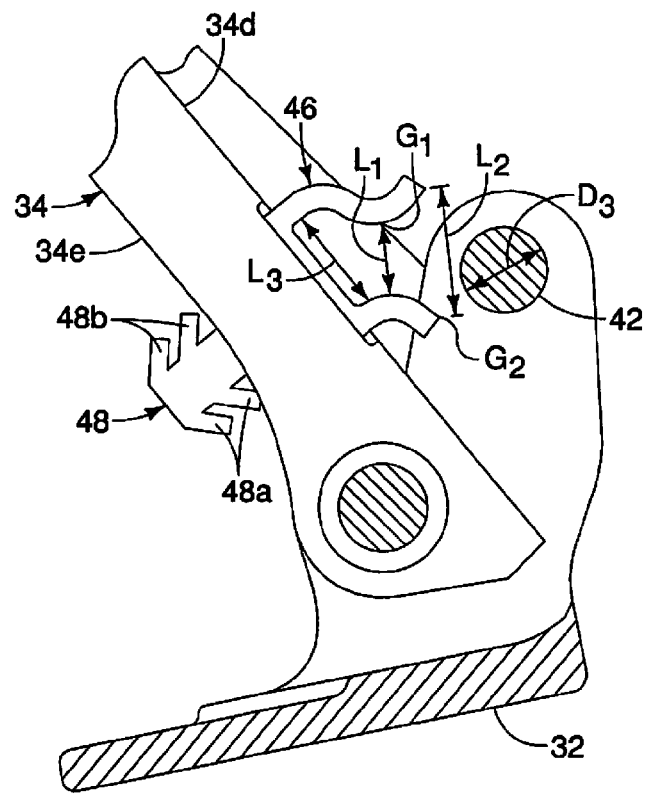
FIG. 18 is an enlarged view of a portion of the hinge structure showing the first and second hinge arms and the door bracket in the intermediate position corresponding to the position of the hinge structure in FIG. 8 (corresponding to the depiction of the door in FIG. 2) with the clip member of the check structure snap-fitted to the bracket pin, in accordance with the first embodiment.
Figure 19:
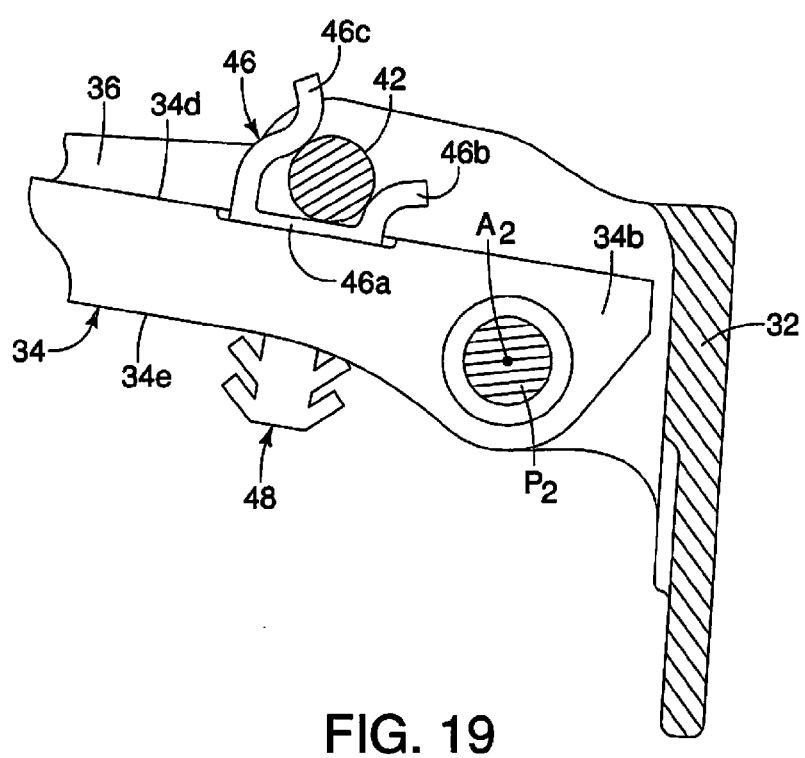
FIG. 19 is another enlarged view of a portion of the hinge structure showing the first and second hinge arms and the door bracket in the fully open position corresponding to the position of the hinge structure in FIG. 8 (corresponding to the depiction of the door in FIG. 3) with the clip member of the check structure spaced apart from the bracket pin, in accordance with the first embodiment.

The check structure 22 is now described with specific reference to FIG. 13 thru 19. As shown in FIG. 13, the check structure 22 includes a clip member 40 and a bracket pin 42. As shown in FIGS. 15-17, the clip member 40 having a main body 44, a clip portion 46 located at a first end 44a of the main body 44, and a retention portion 48 located at a second end 44b of the main body 44. As shown in FIGS. 13, 18 and 19, clip member 40 is installed to the first hinge arm 34 by inserting the retention portion 48 completely through the clip aperture 34f such that the main body 44 of the clip member 40 remains within the clip aperture 34f and extends through the clip aperture 34f. The clip portion 46 is then positioned on the first side 34d of the hinge arm 34 and the retention portion 48 is positioned on the second side 34e of the hinge arm 34.

The retention portion 48 of the clip member 40 includes a pair of first compressible flanges 48a and a pair of second compressible flanges 48b. The first and the second compressible flanges 48a and 48b extend from the second end 44b of the main body 44 of the clip member 40 toward the first end 44a of the main body 44. Respective distal ends of the first and the second compressible flanges 48a and 48b face the second side 34e of the first hinge arm 34 with the main body 44 inserted into the clip aperture 34f, thereby preventing the retention portion 48 from passing through the clip aperture 34f from the second side 34e of the first hinge arm 34 to the first side 34d. The first and the second compressible flanges 48a and 48b have respective lengthwise extending surfaces that define an acute angle as relative to an adjacent one of the first and second side surfaces 44e and 44f of the main body 44 of the clip member 40.

The bracket pin 42 is fixedly attached to the door bracket 32 at a location spaced apart from the second pivot axis $A_2$ such that the clip portion 46 of the clip member 40 engages the bracket pin 42 when the door bracket 20 is in a position corresponding to the fully open position of the door 12. The bracket pin 42 is rigidly and fixedly attached to both the mid-plate 32c and the upper plate 32d of the door bracket 32. The main body 44 of the clip member 40 has a rectangular cross-sectional shape and the clip aperture 34f of the first hinge arm 34 has a corresponding rectangular shape. Further, the main body 44 and the clip aperture 34f are dimensioned to prevent rotation of the clip member 44 with the main body 44 inserted into the clip aperture 34f.

As shown in FIGS. 15-17, the main body 44 of the clip member 40 has a top surface 44c, a bottom surface 44d, a first side surface 44e and a second side surface 44f. The top surface 44c and the bottom surface 44d are substantially parallel to one another. The first side surface 44e and the second side surface 44f are substantially parallel to one another and perpendicular to the top and the bottom surfaces 44c and 44d.

The clip portion 46 has a base 46a, a first clip arm 46b and a second clip arm 46c. The base 46a has a width $W_3$ (FIG. 16) that is wider than the width $W_1$ of the clip aperture 34f. With the clip member 40 installed to the first hinge arm 34, the base 46a is located adjacent the first side 34d of the first hinge arm 34. The first clip arm 46b and the second clip arm 46c (a pair of clip arms) of the clip portion 46 extend away from opposite edges of the base 46a and extend away from the first hinge arm 34. However, the first clip arm 46b and the second clip arm 46c extend away from the base 46a and the main body 44 of the clip member 40 in directions that are non-parallel relative to a lengthwise direction of the main body 44.

As shown in FIG. 16, the first clip arm 46b and the second clip arm 46c have arcuate shapes and curve in directions toward the second end 34c of the first hinge arm 34. More specifically, the first clip arm 46b, curves outward from the base 46a and toward the second end 34c of the first hinge arm 34. The second clip arm 46c has a first portion $46c_1$ that, like the first clip arm 46b, curves outward from the base 46a and toward the second end 34c of the first hinge arm 34. However, an end portion $46c_2$ of the second clip arm 46c curves in a serpentine manner curving outward away from the base 46a, the first clip arm 46b and the first portion $46c_1$. Thus, distal ends of the first clip arm 46b and the second clip arm 46c diverge, extending away from one another.

As is shown in FIGS. 16 and 18, at a point where the arcuate portions of the first clip arm 46b and the second clip arm 46c are closest to one another, a gap $G_1$ is defined with a first distance $L_1$ being defined at the gap $G_1$. Distal ends of the first clip arm 46b and the second clip arm 46c further define a gap $G_2$ with a second distance $L_2$ being defined therebetween. Further, at the intersection of the first clip arm 46b and the second clip arm 46c and the base 46a, the first clip arm 46b and the second clip arm 46c are spaced apart from one another by a third distance $L_3$. The second distance $L_2$ is greater than the first and third distances $L_1$ and $L_3$. Further, the third distance $L_3$ is greater than the first distance $L_1$. As is shown in FIGS. 13, 18 and 19, the gaps $G_1$ and $G_2$ align with the bracket pin 42 as the hinge structure 20 moves the door 12 to the fully open position. Further, the distal ends of the first clip arm 46b and the second clip arm 46c face the bracket pin 42 as the hinge structure 20 moves the door 12 to the fully open position.

The bracket pin 42 has an outer surface that defines a diameter $D_3$. As shown in FIGS. 13, 18 and 19, the diameter $D_3$ is larger than the first distance $L_1$ but smaller than the second distance $L_2$. Further, the third distance $L_3$ and the diameter $D_3$ are dimensioned such that with the bracket pin 42 located against the base 46a of the clip portion 46 between the first and second clip arms 46b and 46c, the first and second clip arms 46b and 46c snugly retain the bracket pin 42 therebetween, as shown in FIG. 19. The clip member 40 is made of either a metallic material or strong polymer materials such that the first and second clip arms 46b and 46c are resilient with some elasticity. Specifically, the first and second clip arms 46b and 46c elastically move away from one another when the bracket pin 42 is pushed therebetween. However, the first and second clip arms 46b and 46c have sufficient biasing force to retain the bracket pin 42 therebetween and hold the door 12 in the fully open position (FIG. 3).

Hence, when the door 12 is moved to the fully open position (FIG. 3) the door bracket 32 is rotated in an arcuate path bringing the first and second clip arms 46b and 46c into contact with the bracket pin 42. The vehicle operator moving the door 12 to the fully open position applies a predetermined amount of force to the door 12 thereby pushing the first and second clip arms 46b and 46c such that they elastically move away from each other due to contact with the bracket pin 42 and the bracket pin 42 is forced therebetween. In effect, the first and second clip arms 46b and 46c snap-fit around the bracket pin 42. Once completely in the fully open position (FIG. 3), the first and second clip arms 46b and 46c snugly retain the bracket pin 42 and hence retain the door 12 in the fully open position (FIG. 3). In order to move the door 12 out of the fully open position, the door 12 is pulled with a predetermined amount of force, thereby pulling the first and second clip arms 46b and 46c away from the bracket pin 42.

The check structure 22 is advantageous in that it prevents the door 12 from moving away from the fully open position by, for example, excessive amounts of wind urging the door 12 to move, or gravity, when the vehicle 10 is parked on a slope or hill where gravity might otherwise urge the door 12 to close. It should be understood from the drawings and the description herein that the clip member 40 of the check structure 22 can be made of any of a variety of materials and be re-dimensioned in order to exert sufficient force to the bracket pin 42 in order to retain the door 12 in the fully open position.

Second Embodiment

Figure 20:
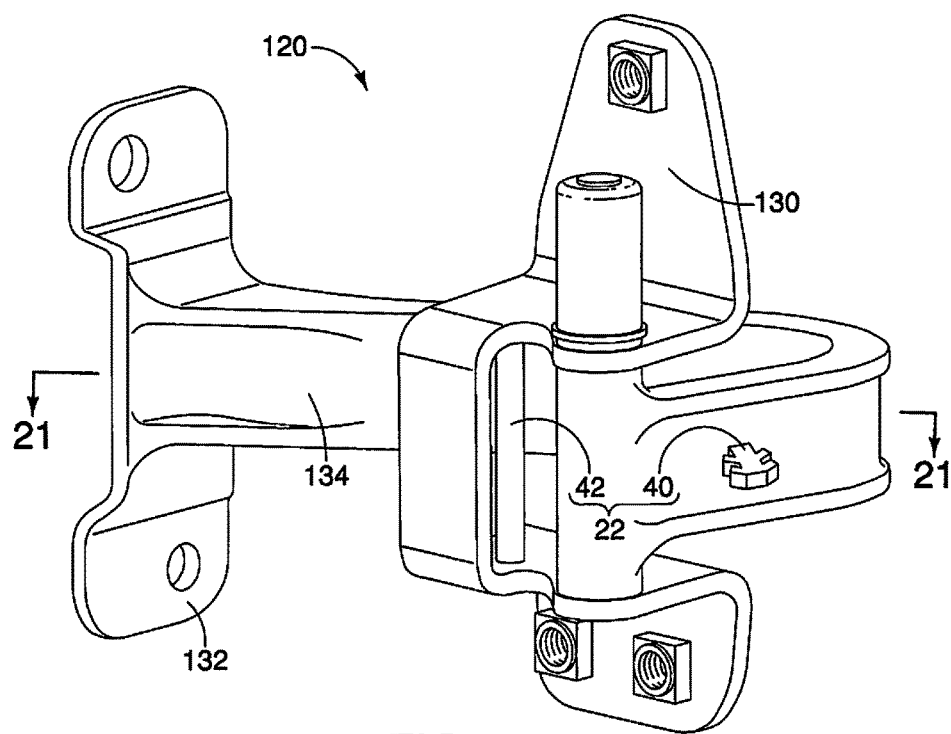
FIG. 20 is a perspective view of a hinge structure having a body bracket, a hinge arm with a door bracket rigidly fixed thereto and a check structure that includes a clip member fixed to the hinge arm and a bracket pin fixed to the body bracket in accordance with a second embodiment.
Figure 21:
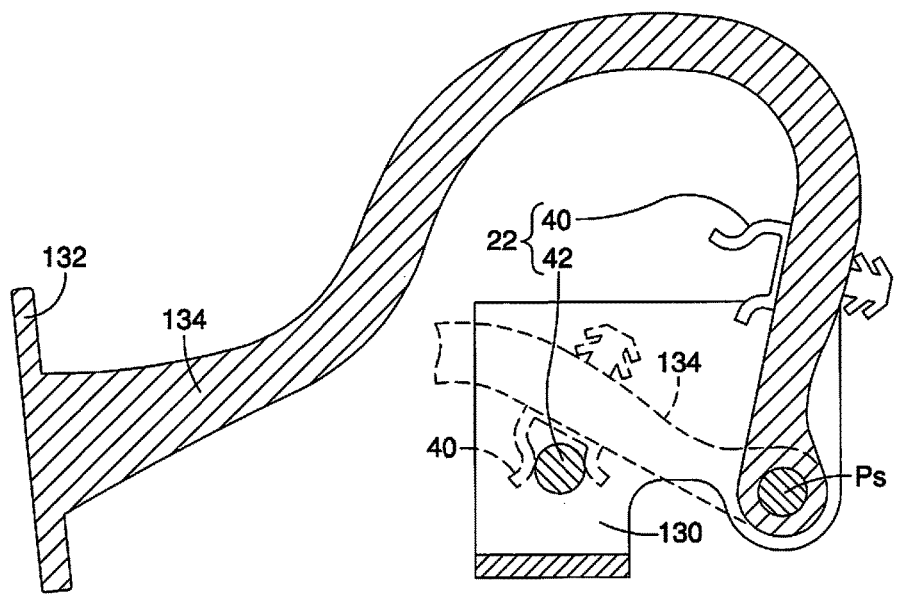
FIG. 21 is a cross-sectional view of the hinge structure depicted in FIG. 20 showing the clip member of the check structure fixed to the hinge arm and the bracket pin fixed to the body bracket in accordance with the second embodiment.
Figure 22:
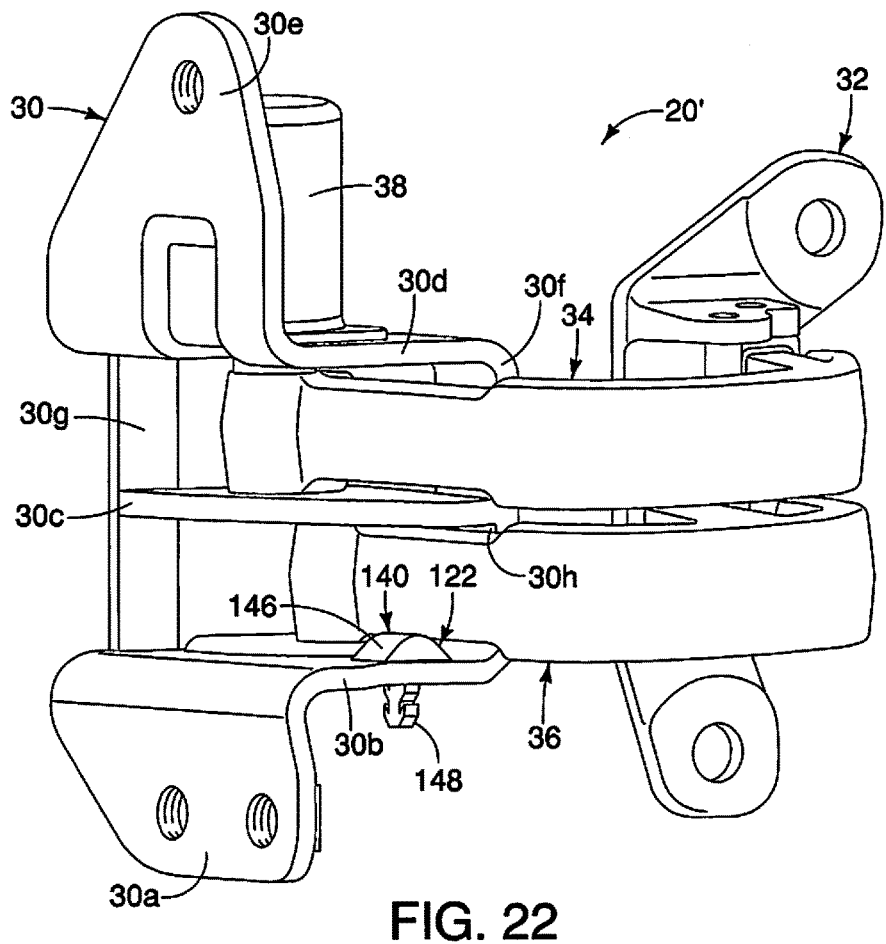
FIG. 22 is a perspective view of a hinge structure having a body bracket, a first hinge arm, a second hinge arm, a door bracket and a check structure in accordance with the third embodiment.

Referring now to FIGS. 20 and 21, a hinge structure 120 having the check structure 22 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the hinge structure 20 is replaced with the hinge structure 120. The hinge structure 120 is provided with the check structure 22 as described above with respect to the first embodiment.

The hinge structure 120 includes a body bracket 130 and a hinge arm 134. The body bracket 130 includes a pivot pin $P_5$ such that the hinge arm 134 pivots relative to the body bracket 130 about the pivot pin $P_5$. The hinge arm 134 is formed integrally with a door bracket portion 132 as a single, unitary, monolithic element. The body bracket 130 is configured to attach to the vehicle 10 and the door bracket portion 132 is configured to attach to the door 12 in a manner similar to the hinge structure 20 of the first embodiment. However, as discussed above, the hinge structure 20 of the first embodiment is configured to support the door 12 for pivoting movement along a 170 degree movement path. In the second embodiment, the hinge structure 120 is configured to support the door 12 for pivoting movement along a movement path that is less than 170 degrees, for example, 90 degrees.

The check structure 22 includes the clip member 40 and the bracket pin 42, as described above. However, in the second embodiment, the bracket pin 42 is fixed to the body bracket 130 and the clip member 40 is installed into a clip aperture formed in the hinge arm 134 adjacent to the body bracket 130. The function of the check structure 22 is identical to the usage in the first embodiment, except that a different hinge structure is provided with the check structure 22.

Third Embodiment

Referring now to FIGS. 22-30, a hinge structure 20' having a compressible check structure 122 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The hinge structure 20' of the third embodiment is identical to the hinge structure 20 of the first embodiment, except that the check structure 22 is removed and replaced with the compressible check structure 122. Specifically, both the clip member 40 and the bracket pin 42 are removed from the hinge structure 20 and replaced with the compressible check structure 122.

More specifically, the hinge structure 20' includes the body bracket 30, the door bracket 32, the first hinge arm 34, the second hinge arm 36 and (optionally) the primary check structure 38, as described above with respect to the first embodiment, except that the check structure 22 is removed or omitted. Since the body bracket 30, the door bracket 32, the first hinge arm 34 and the second hinge arm 36 include all of the structures and features described in the first embodiment, description of these elements for the third embodiment is omitted for the sake of brevity.

The compressible check structure 122 basically includes a stop surface 30h (see FIGS. 11, 12, 22 and 28-30) formed on the support portion 30f of the body bracket 30, a movement limiting surface 36i defined along an underside of the second hinge arm 36 and a compressible member 140. The compressible member 140 has a main body 144, a compressible portion 146 and a retention portion 148.

Figure 23:
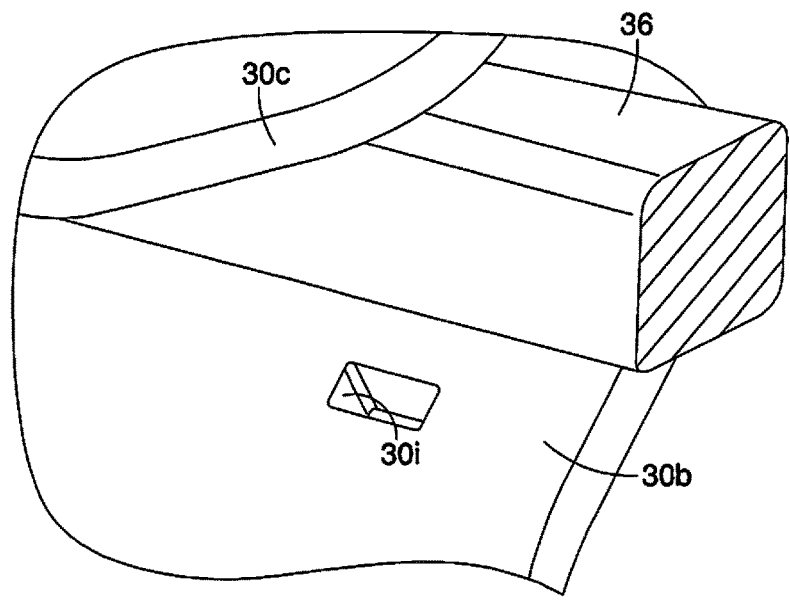
FIG. 23 is a perspective view of a portion of the hinge structure showing a compressible member of the check structure installed to the body bracket in accordance with the third embodiment.
Figure 24:
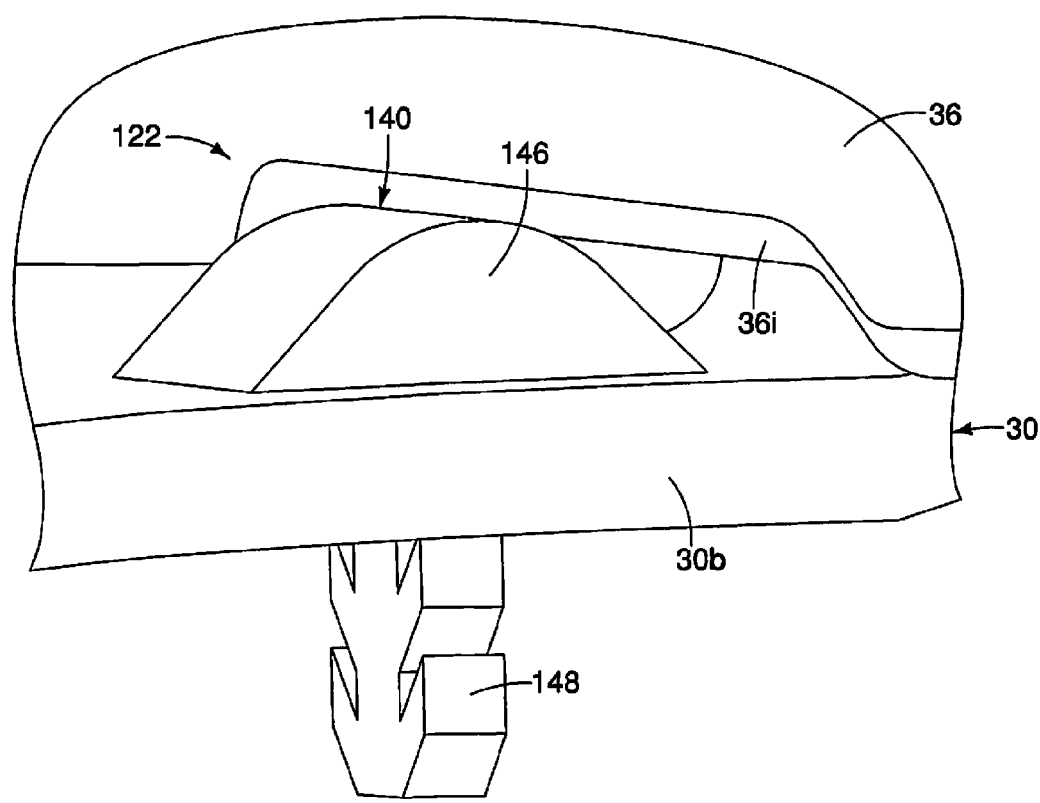
FIG. 24 is another perspective view of the portion of the hinge structure showing the compressible member of the check structure installed to the body bracket in accordance with the third embodiment.
Figure 25:
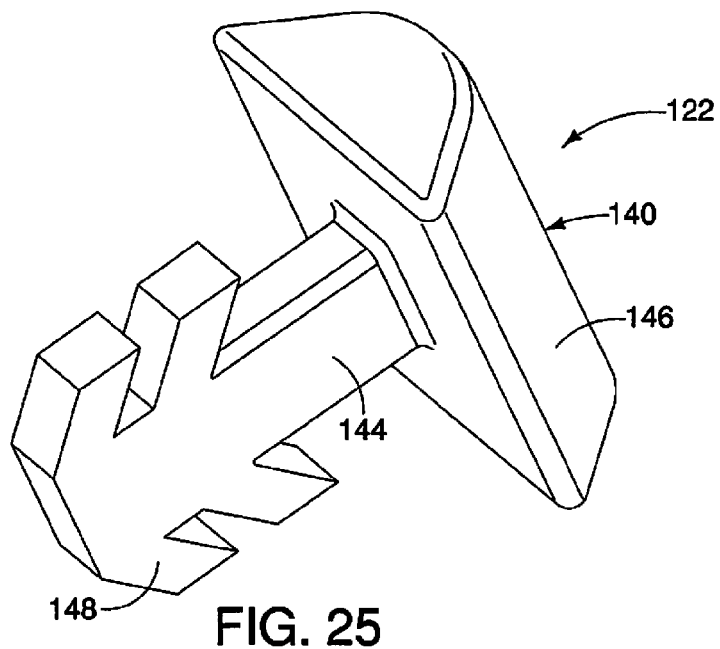
FIG. 25 is a perspective view of the compressible member of the check structure shown removed from the hinge structure in accordance with the third embodiment.
Figure 26:
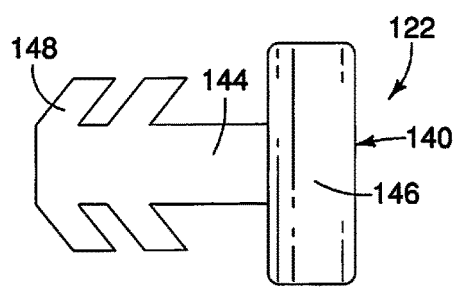
FIG. 26 is a first side view of the compressible member of the check structure shown removed from the hinge structure in accordance with the third embodiment.
Figure 27:
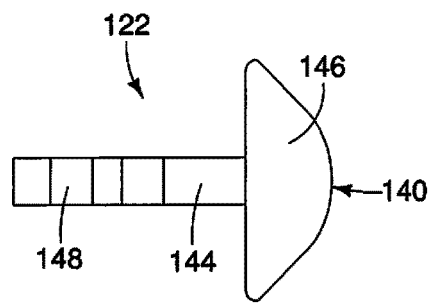
FIG. 27 is a second side view of the compressible member of the check structure shown removed from the hinge structure in accordance with the third embodiment.

Further, in the third embodiment, the lower plate 30b of the body bracket 30 includes an aperture 30i, as shown in FIG. 23. The compressible member 140 is fixed to the lower plate 30b by the installation of the main body 144 into the aperture 30i. Once installed, the retention portion 148 is located on a lower surface of the lower plate 30b of the body bracket 30 and the compressible portion 146 is located along an upper surface of the lower plate 30b of the body bracket 30.

The main body 144 has a rectangular cross-section, and the aperture 30i has a corresponding rectangular shape. Further, the main body 144 and the aperture 30i are dimensioned to prevent rotation of the compressible member 140 with the main body 144 inserted into the aperture 30i.

The compressible member 140, and in particular, the compressible portion 146 of the compressible member 140, is made of an elastic material such that contact between the compressible portion 146 and the movement limiting surface 36i of the hinge arm 36 during movement of the hinge arm 36 generates friction therebetween.

Figure 28:
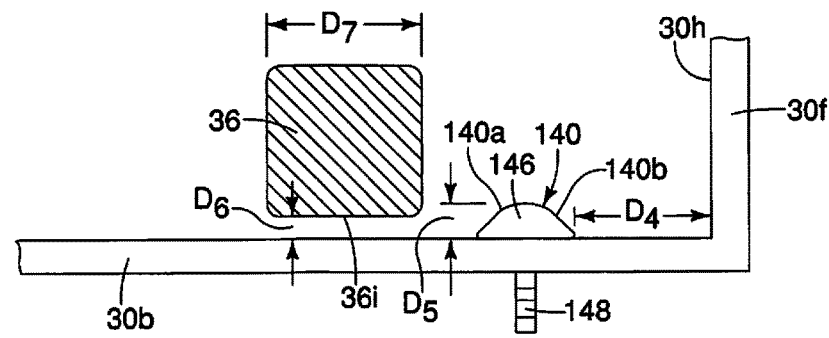
FIG. 28 is a side view of a portion of the hinge structure showing one of the hinge arms in a location corresponding to the intermediate position (FIG. 2) with the hinge arm being spaced apart from the compressible member of the check structure in accordance with the third embodiment.

The compressible portion 146 of the compressible member 140 is located on the body bracket 30 at a location that is adjacent to but spaced apart from the stop surface 30h of the body bracket 30j. Specifically, the compressible portion 146 is spaced apart from the stop surface 30h by a distance $D_4$, as shown in FIG. 28. Further, the compressible portion 146 extends upward from the upper surface of the lower plate 30b in an uncompressed state by a distance $D_5$, as is also shown in FIG. 28. In other words, the compressible portion 146 has a height in an uncompressed state that is equal to the distance $D_5$, as is also shown in FIG. 28.

Figure 29:
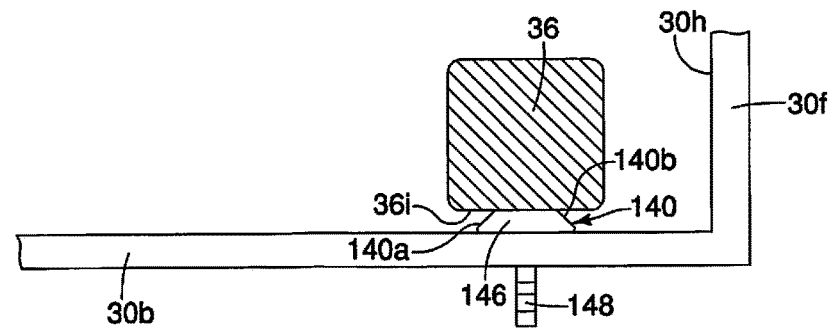
FIG. 29 is another side view of the portion of the hinge structure depicted in FIG. 28 showing the hinge arm in a location between the intermediate position (FIG. 2) and the fully open position (FIG. 3) with the hinge arm compressing the compressible member of the check structure in accordance with the third embodiment.
Figure 30:
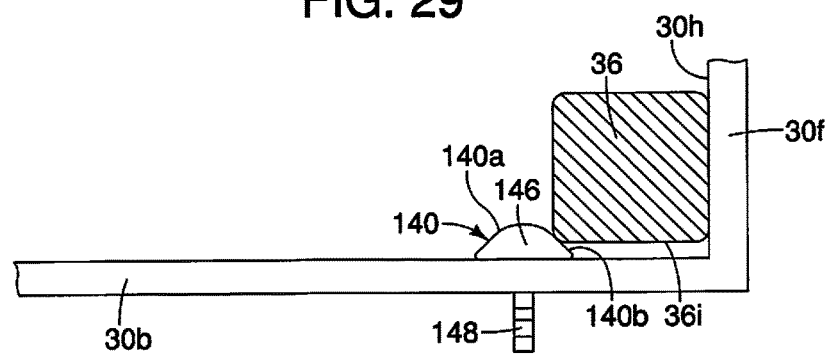
FIG. 30 is yet another side view of the portion of the hinge structure depicted in FIGS. 28 and 29 showing the hinge arm in a location between the compressible member and a surface of a support portion of the body bracket, the position of the hinge arm corresponding to the fully open position (FIG. 3) with the hinge arm being retained in the fully open position by the compressible member of the check structure in accordance with the third embodiment.

As shown in FIGS. 28-30, when pivoting about the third axis $A_3$, the second hinge arm 36 moves in directions parallel to the lower plate 30b. During the pivoting movement of the second hinge arm 36, the second hinge arm 36 is spaced apart from the lower plate 30b of the body bracket 30 by a distance $D_6$, as shown in FIG. 28. The distance $D_6$ is less than the distance $D_5$. Consequently, when the second hinge arm 36 moves over the compressible portion 146 of the compressible member 140, the movement limiting surface 36i contacts the compressible portion 146 compressing the compressible portion 146, as shown in FIG. 29, and described in greater detail below.

The retention portion 148 includes compressible flanges that are essentially the same as the first compressible flanges 48a and the second compressible flanges 48b described above with respect to the first embodiment. Since the dimensions, purpose and function of the compressible flanges of the retention portion 148 are basically the same as or identical to dimensions, purpose and function of the first compressible flanges 48a and the second compressible flanges 48b of the clip member 40 of the first embodiment, further description is omitted for the sake of brevity.

As shown in FIGS. 28-30, when the second hinge arm 36 (and hence the door 12) is moved from the intermediate position (FIG. 2) to the fully open position (FIG. 3), the movement limiting surface 36i of the second hinge arm 36 contacts and compresses the compressible portion 146. As mentioned above and shown in FIG. 28, the movement limiting surface 36i is spaced apart from the lower plate 30b by the distance $D_6$, which is smaller than the height (the distance $D_5$) of the compressible portion 146. Consequently, as shown in FIG. 29, contact between the movement limiting surface 36i and the compressible portion 146 compresses the compressible portion 146. This contact generates friction between the compressible member 140 and the second hinge arm 36, requiring a vehicle operator to apply additional force on the hinge structure 20' (and the door 12) in order to move the second hinge arm 36 over the compressible portion 146. Therefore, once the second hinge arm 36 is moved to the position shown in FIG. 30, the compressible portion 146 decompresses to the height (distance $D_5$) and retains the second hinge arm 36 in the depicted position (corresponding to the fully open position of the door 12 in FIG. 3). The second hinge arm 36 and hence the door 12 is retained in the fully open position with the second hinge arm 36 in the position shown in FIG. 30 until the movement described above is reversed while sufficient force is applied to the door 12 and the hinge structure 20' to overcome the friction forces generated by movement of the second hinge arm 36 back to the position shown in FIG. 28.

The second hinge arm 36 has a width that is equal to the distance $D_7$, as shown in FIG. 28. The distance $D_7$ is approximately equal to or slightly less than the distance $D_4$ between the stop surface 30h and the compressible member 140. Therefore, when the second hinge arm 36 is positioned within the space or gap between the stop surface 30h and the compressible member 140, the second hinge arm 36 and hence the hinge structure 20' and the door 12 are snuggly retained in the fully open position (FIG. 3).

The compressible check structure 122 provides essentially the same function and benefits to the hinge structure 20' as the check structure 22 provides to the hinge structure 20 of the first embodiment. For example, as shown in FIGS. 28-30, the compressible member 140 has ramped leading surface 140a and ramped trailing surface 140b. There is a gradual increase in resistance to movement as the second hinge arm 36 contacts the ramped leading surface 140a a begins to compress the compressible member 140. Similarly, there is a gradual decrease of resistance to movement as the second hinge arm 36 moves along the ramping trailing surface 140b. This gives the effect similar to more conventional check structures.

Fourth Embodiment

Figure 31:
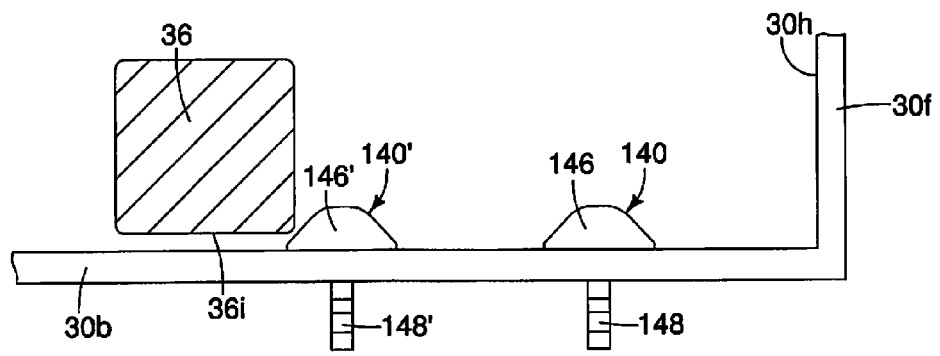
FIG. 31 is a side view of a portion of a hinge structure identical to that depicted in FIGS. 22-30 except that a second compressible member has been added showing the hinge arm in a location corresponding to a first open position with the hinge arm being located on a first side of the second compressible member and spaced apart from the compressible member of the check structure in accordance with a fourth embodiment.
Figure 32:
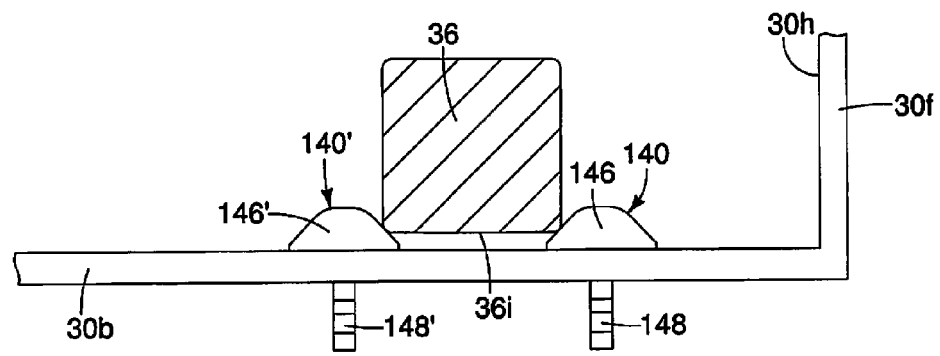
FIG. 32 is another side view of the portion of the hinge structure depicted in FIG. 31 showing the hinge arm in a location between the first open position and the fully open position between the compressible member and the second compressible member in accordance with the fourth embodiment.
Figure 33:
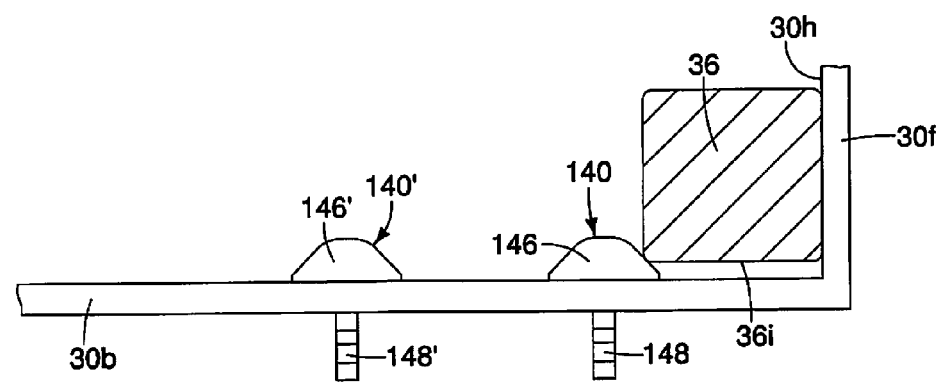
FIG. 33 is yet another side view of the portion of the hinge structure depicted in FIGS. 31 and 32 showing the hinge arm in a location between the compressible member and the surface of a support portion of the body bracket, the position of the hinge arm corresponding to the fully open position (FIG. 3) with the hinge arm being retained in the fully open position by the compressible member of the check structure in accordance with the fourth embodiment.

Referring now to FIGS. 31-33, the hinge structure 20' of the third embodiment is modified to include a second compressible member 140' in accordance with a fourth embodiment.

Basically, the hinge structure 20' is exactly as described above with respect to the third embodiment, except that a second compressible member 140' has been added to the second hinge arm 36, as shown in FIGS. 31-33. The second compressible member 140' includes a main body 144', a compressible portion 146' and a retention portion 148' that are identical to the main body 144, the compressible portion 146 and the retention portion 148 described above with respect to the third embodiment. However, the second compressible member 140' is spaced apart from the compressible member 140 thereby providing a retention location that is separate and distinct from the fully open position of the door 12 represented in FIG. 33. Specifically, as shown in FIG. 32, the second hinge arm 36 can be retained in the retention location defined between the compressible member 140 and the second compressible member 140'.

Fifth Embodiment

Figure 34:
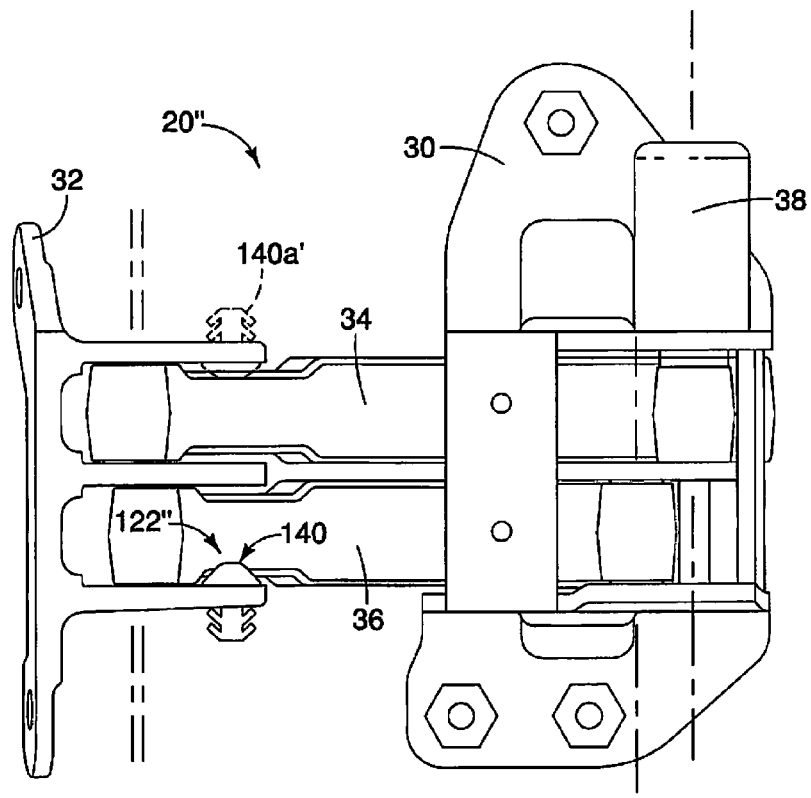
FIG. 34 is a side view of a hinge structure similar to that depicted in FIG. 10, having a body bracket, a first hinge arm, a second hinge arm, a door bracket and a check structure, the body bracket, the first and second hinge arms and the door bracket being similar to the first embodiment, with the check structure having a compressible member that is installed to the door bracket in accordance with a fifth embodiment.

Referring now to FIG. 34, a hinge structure 20" in accordance with a fifth embodiment will now be explained. In view of the similarity between the second and fifth embodiments, the parts of the fifth embodiment that are identical to the parts of the second embodiment will be given the same reference numerals as the parts of the second embodiment. Moreover, the descriptions of the parts of the fifth embodiment that are identical to the parts of the second embodiment may be omitted for the sake of brevity. The parts of the fifth embodiment that differ from the parts of the second embodiment will be indicated with a double prime (").

In the fifth embodiment, the hinge structure 20" is identical to the hinge structure 20 of the first embodiment, except that the check structure 22 has been removed and a compression check structure 122" has been added. Specifically, the compression check structure 122" includes the compression member 140 as described above with respect to the third embodiment. The compression member 140 has been installed to the door bracket 32 for compressive contact with the second hinge arm 36. Contact between the second hinge arm 36 and the compression member 140 provides essentially the same effects and function of the compressible check structure 122 of the third embodiment. Alternatively, a compression member 140a' (shown in phantom in FIG. 34) can be installed to the door bracket 32 for compressive contact with the first hinge arm 34. Further, the compression member 140a' can be installed to the door bracket 32 for compressive contact with an upper surface of the first hinge arm 34. It should be understood that one or more of the compression member 140 and/or the compression member 140a' can be installed to the door bracket 32 and any of a variety of locations to contact one of the first hinge arm 34, the second hinge arm 36 or both the first and second hinge arms 34 and 36.

Sixth Embodiment

Figure 35:
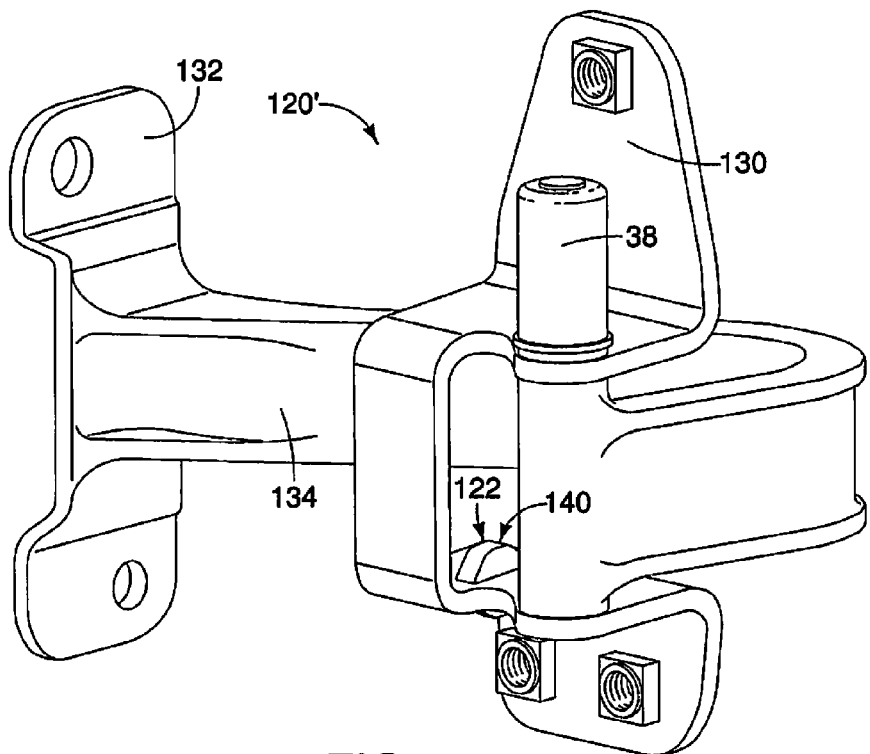
FIG. 35 is a perspective view of a hinge structure similar to that depicted in FIG. 20, having a body bracket, a hinge arm with a door bracket rigidly fixed thereto and a check structure that includes a compressible member installed to the body bracket in accordance with a sixth embodiment.
Figure 36:
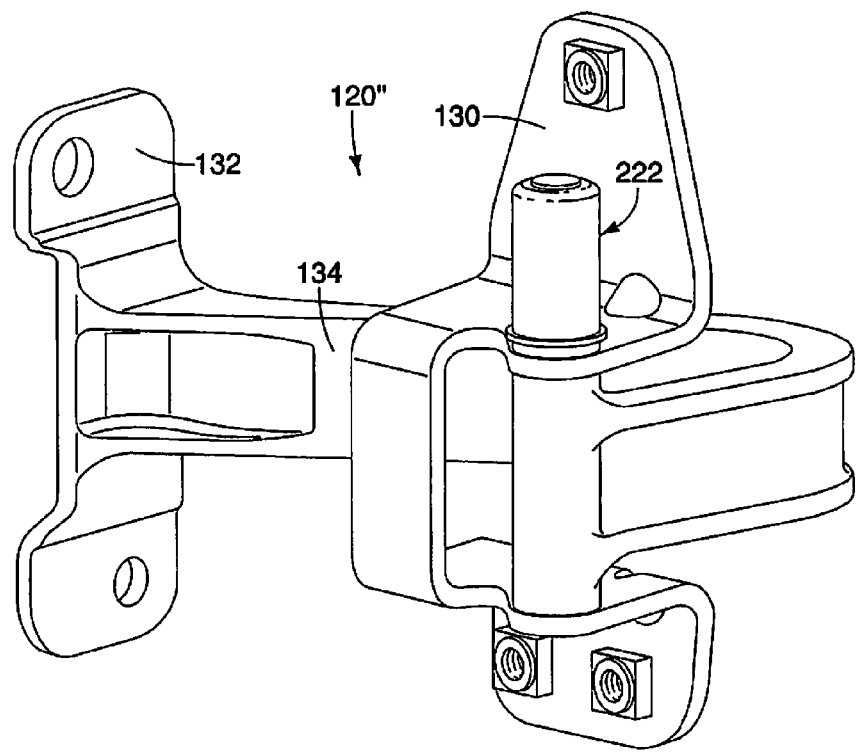
FIG. 36 is a perspective view of a hinge structure similar to that depicted in FIGS. 20 and 35, having a body bracket, a hinge arm with a door bracket rigidly fixed thereto and a hydraulic check structure installed to the body bracket in accordance with a seventh embodiment.
Figure 37:
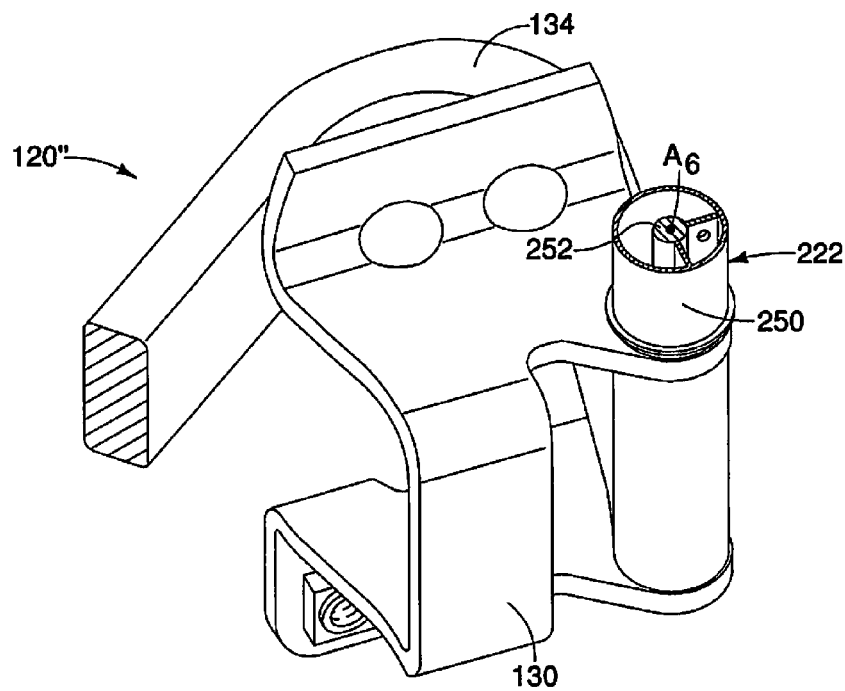
FIG. 37 is a perspective view of a portion of the hinge structure depicted in FIG. 36, showing the hydraulic check structure in cross-section in accordance with a seventh embodiment.

Referring now to FIG. 35, a hinge structure 120' in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity. The parts of the sixth embodiment that differ from the parts of the first embodiment will be indicated with a single prime (')

In the sixth embodiment, the hinge structure 120 according to the second embodiment is modified thereby defining the hinge structure 120'. Specifically, the hinge structure 120' includes the compressible check structure 122 of the third embodiment. Specifically, the compressible member 140 is installed to the body bracket 130 for contact with the hinge arm 134 provides essentially the same effects and function of the compressible check structure 122 as described above with respect to the third embodiment.

Seventh Embodiment

Referring now to FIG. 36-42, a hinge structure 120" in accordance with a seventh embodiment will now be explained. In view of the similarity between the first, second and seventh embodiments, the parts of the seventh embodiment that are identical to the parts of the first and second embodiments will be given the same reference numerals as the parts of the first or second embodiments. Moreover, the descriptions of the parts of the seventh embodiment that are identical to the parts of the first or second embodiments may be omitted for the sake of brevity. The parts of the seventh embodiment that differ from the parts of the first and second embodiments will be indicated with a single prime (') or a double prime (").

In the seventh embodiment, the hinge structure 120 of the second embodiment is modified thereby defining the hinge structure 120". Specifically, the hinge structure 120 is modified by the removal of the check structure 22 and the hinge structure 120" is provided with a hydraulic check structure 222. Further, the hinge structure 120" is installed to the vehicle 10 and the door 12, supporting the door 12 during pivoting movement between the closed position and the open positions of the door 12.

Figure 38:
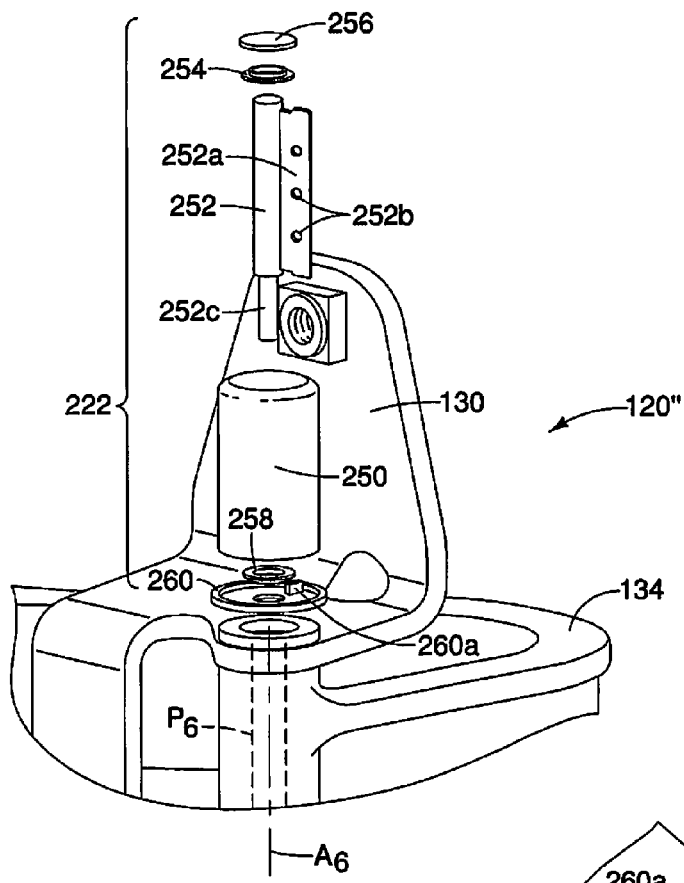
FIG. 38 is an exploded perspective view of a portion of the hinge structure showing the various elements of the hydraulic check structure including a casing and a shaft with a fluid resistance paddle in accordance with the seventh embodiment.
Figure 39:
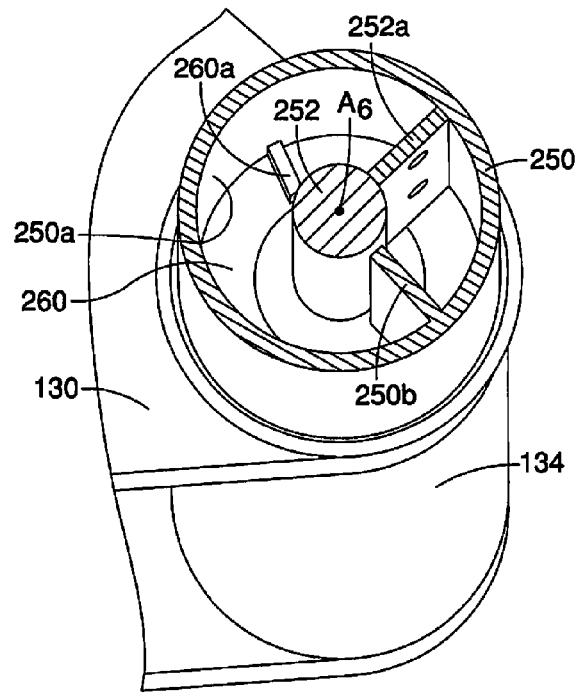
FIG. 39 is a perspective view of the hydraulic check structure showing details of the casing and the shaft in accordance with the seventh embodiment.

The hinge structure 120" includes the above described body bracket 130 and the hinge arm 134. The body bracket 130 includes a pivot pin $P_6$ as shown in FIG. 38. The hinge arm 134 is fixedly attached to the pivot pin $P_6$ such that both the hinge arm 134 and the pivot pin $P_6$ can rotate or pivot relative to the body bracket 130 about a pivot axis $A_6$. The hinge arm 134 is formed integrally with a door bracket portion 132 as a single, unitary, monolithic element. The body bracket 130 is configured to attach to the vehicle 10 and the door bracket portion 132 is configured to attach to the door 12 in a manner similar to the hinge structure 20 of the first embodiment. However, as discussed above, the hinge structure 20 of the first embodiment is configured to support the door 12 for pivoting movement along a 170 degree movement path. In the second and seventh embodiments, the hinge structure 120 is configured to support the door 12 for pivoting movement along a movement path that is less than 170 degrees, for example, 90 degrees.

The check structure 222 includes a case 250, a shaft 252, a top seal 254, a cap 256, a lower seal 258 and a base plate 260.

The case 250 is a cylindrically shaped member non-movably attached via the base plate 260 to the body bracket 130 such that the case 250 does not pivot or rotate relative to the body bracket 130. More specifically, the case 250 and/or the base plate 260 can be mechanically fastened to the body bracket 130 or can be welded or otherwise rigidly fixed to the body bracket 130 in a conventional manner. The case 250 has a cylindrically shaped inner surface 250a that defines a fluid chamber within the case 250. The case 250 includes a wall portion 250b that is rigidly fixed to the cylindrically shaped inner surface 250a and extends radially inward to the pivot shaft 252. A radially inner edge 250c of the wall portion 250b can include a seal (not shown) or can be finely machined to contact the shaft 252 creating a fluid seal therebetween. Specifically, the shaft 252 rotates relative to the case 250 and the wall portion 250b. However, hydraulic fluid within the case 250 is prevented from passing between the radially inner edge 250c and the shaft 252.

The wall portion 250b is a rectangular shaped structural element that is rigidly and non-movably attached to the inner surface 250a of the case 250.

The shaft 252 includes a paddle 252a having fluid apertures 252b and a lower shaft portion 252c. The paddle 252a is rigidly fixed to the shaft 252 and pivots with the shaft 252. The fluid apertures 252b extend from a first side 252d to a second side 252e of the paddle 252a. The fluid apertures 252b are dimensioned to limit flow of hydraulic fluid from one of the first and second sides 252d and 252e to the other of the first and second sides 252d and 252e as is explained in greater detail below. A radially outer most edge 252g can include a seal (not shown) or can be finely machined to contact the cylindrically shaped inner surface 250a of the case 250 creating a fluid seal therebetween.

The lower shaft portion 252c is configured to pivot with the pivot pin $P_6$ and the hinge arm 134. For example, the lower shaft portion 252c can be integrally formed with the pivot pin $P_6$ of the hinge structure 120" as a single monolithic shaft or pin, or alternatively can be provided with interlocking surfaces that connect the two together such that lower shaft portion 252c and the pivot pin P₆ are fixedly connected to one another. Further, the shaft 252 and the pivot pin P₆ are supported for pivoting movement relative to the case 250 and relative to the body bracket 130. Rather, the shaft 252 and the pivot pin P₆ are fixed to or otherwise mechanically fastened to the hinge arm 134 for pivoting movement therewith. The door bracket 132 being fixed to, for example, the door 12 pivots about the axis A₆ and causes corresponding movement of the paddle 252a while the casing 250 remains stationary being non-movably fixed to the body bracket 130.

The cap 252 defines a shaft support structure that supports an upper end of the shaft 252 in a conventional manner. Specifically, the cap 252 can include a bushing or bearing (not shown) that supports the shaft 252 for pivoting movement with respect thereto.

The cap 256 and the base plate 260 are configured to rigidly and fixedly attach to the case 250 in a conventional manner, such as mechanical threads or other conventional mechanical attachment structure. The top seal 254 is interposed between the cap 256 and the upper end of the case 250 thereby sealing the upper end of the case 250. Similarly, the lower seal 258 is interposed between the base plate 260 and the lower end of the case 250 thereby sealing the lower end of the case 250.

The base plate 260 includes a shaft opening that defines a bushing and receives the lower shaft portion 252c thereby defining another shaft support structure. The base plate 260 also includes a projection 260a that is described in greater detail below. It should be understood from the drawings and the description herein that the case 250 can be constructed with the cap 256 as an integral part thereof, thereby eliminating the need for the top seal 254.

When fully assembled and installed to the body bracket 130 of the hinge structure 120", the case 250 is sealed and filled with hydraulic fluid. The wall portion 250b, as described above, is shaped and dimensioned relative to the fluid chamber defined by the case 250 is such that hydraulic fluid is prevented from moving from a first side of the wall portion 250b to a second side of the wall portion 250b. Consequently when there is pivoting movement of the shaft 252 within the case 250, the hydraulic fluid is forced to move through the fluid apertures 252b from one of the first side 252d and the second side 252e of the paddle 252a to the other of the first side 252d and the second side 252e of the paddle 252. Therefore, force is required to pivot the shaft 252 in order to overcome the resistance to fluid flow provided by the paddle 252. Since the shaft 252 is fixed to the pivot pin P₆, the pivot pin P₆ is fixed to the hinge arm 134 and the door bracket 132, and the door bracket 132 is fixed to the door 12, the check structure 222 provides resistance to movement of the door 12 from any and all movement positions. Hence, the check structure 222 is an infinite check structure in that it provides a constant resistance to movement regardless of the location of the door 12, whether open partially open or fully open.

The amount of resistance to movement of the door 12 via the check structure 222 depends is part upon the type of hydraulic fluid used within the case 250 and the number and overall dimensions of the fluid apertures 252b. For a vehicle having a large heavy door mounted to the hinge structure 120", a larger size and/or larger number fluid apertures 252b are necessary. For a smaller door mounted to the hinge structure 120", a smaller diameter and/or smaller number fluid apertures 252b are necessary.

Figure 40:
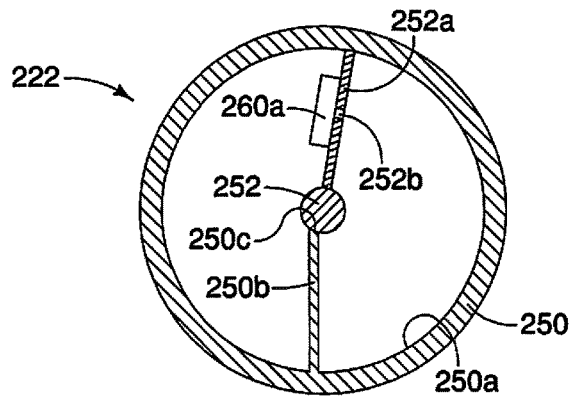
FIG. 40 is a schematic cross-sectional top view of the internal components of the hydraulic check structure showing the shaft and the fluid resistance paddle is a position corresponding to a fully open position (FIG. 3) in accordance with the seventh embodiment.
Figure 41:
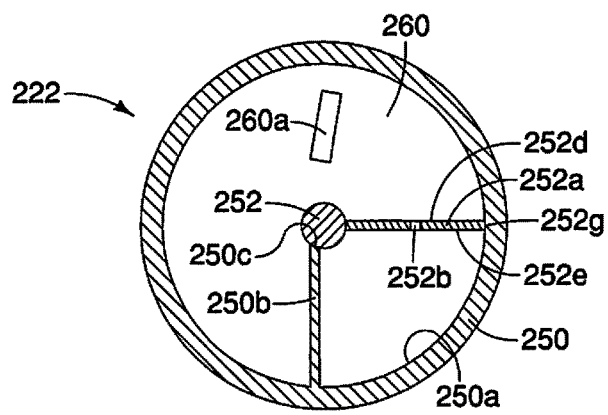
FIG. 41 is another schematic cross-sectional top view of the internal components of the hydraulic check structure similar to FIG. 40 showing the shaft and the fluid resistance paddle is a position corresponding to an intermediate position (FIG. 2) in accordance with the seventh embodiment.

The projection 260a of the base plate 260 is a stop flange that extends into the hydraulic chamber and defines a stop surface that contacts the paddle 252a as shown in FIG. 40. Specifically, the projection 260a limits pivotal movement of the pivot shaft 252 and the paddle 252a due to contact between the paddle 252a and the projection 260a.

Since fluid is prevented from moving around the wall portion 250b (from a first side of the wall portion 250b to a second side of the wall portion 250b) pivoting movement of the shaft 252 and the paddle 252a forces the hydraulic fluid to move through the fluid apertures 252b from one of the first and second sides 252d and 252e of the paddle 252a to the other of the first and second sides 252d and 252e of the paddle 252a.

When the paddle 252a is in contact with the projection 260a, as shown in FIG. 40, the shaft 252 is prevented from moving in the counter clockwise direction because the projection 260a serves as a stop surface. Therefore, the projection 260a defines a limiter restricting pivoting movement of the paddle 252a, the shaft 252, and the door 12. With the door 12 installed to the hinge structure 120", the position of the paddle 252a in FIG. 40 corresponds to the door 12 being in a fully open position, as shown in FIG. 3.

In order to move the door 12 away from the fully open position, force must be applied to the door 12 (and the hinge structure 120") in order to force the fluid on the second side 252e of the paddle 252a to move through the fluid apertures 252b to the first side 252d of the paddle 252a. The fluid pressure built up on the second side 252e of the paddle 252a forces the hydraulic fluid within the case 250 to move through the fluid apertures 252b. As the hydraulic fluid moves, the paddle 252a, the hinge arm 134 and the door 12 will move away from the fully open position to, for example, the intermediate open position shown in FIG. 2 and corresponding to the position of the paddle 252a shown in FIG. 41. Further movement of the door 12, the hinge structure 120", the shaft 252 and the paddle 252a continues to force hydraulic fluid through the fluid apertures 252b until the door 12 closes, as shown in FIG. 1, and with the paddle 252a moved to the position shown in FIG. 42.

Once the door 12 is moved to a desired position, with the shaft 252 and the paddle 252a being stationary relative to the case 250, equilibrium of fluid pressure of the hydraulic fluid at the first side 252d and the second side 252e of the paddle 252a imparts a resistance to pivoting movement of the shaft 252 (and the door 12) relative to the case 250, the body bracket 130 and the vehicle 10.

Figure 42:
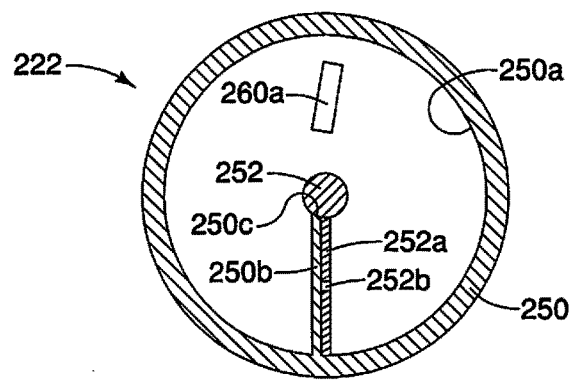
FIG. 42 is yet another schematic cross-sectional top view of the internal components of the hydraulic check structure with the shaft and the fluid resistance paddle is a position corresponding to a closed position (FIG. 1) in accordance with the seventh embodiment.

In FIG. 42, the wall portion 250b serves as another stop surface that prevents further movement of the paddle 252a and the shaft 252. Consequently positioning of the base plate 260 and the projection 260a relative to the case 250 and the wall portion 250b of the case 250 provides a means for adjusting the total angle of pivoting movement of check structure 222 relative to the hinge structure 120". For example, in the depicted embodiment, and in particular FIGS. 40-41, the check structure 222 is adjusted to operate with a hinge structure that has an overall pivoting range of approximately 90 degrees. The relative positions of the projection 260a and the wall portion 250b can be changed by repositioning the base plate 260 relative to the case 250 for a hinge structure that has an overall pivoting range of approximately 170 degrees, or any pivoting range.

In the seventh embodiment, the check structure 222 is located at an upper side of the body bracket 130. However, in should be understood that the check structure 222 can be installed to any of a variety of locations and can be used with any of a variety of hinge structures. For example, the check structure 222 can be installed to the hinge structure 20 shown in FIGS. 3-19 replacing the optional primary check structure 38. Further the check structure 222 can be installed to the hinge structure 120 depicted in FIGS. 20 and 21.

In modification to the seventh embodiment, the stop projection 260a can alternatively be formed with or fixed to a portion of the cylindrically shaped inner surface 250a of the case 250. Such a stop projection on the cylindrically shaped inner surface 250a of the case 250 has the same effect as the stop projection 260a described above.

Eighth Embodiment

Figure 43:
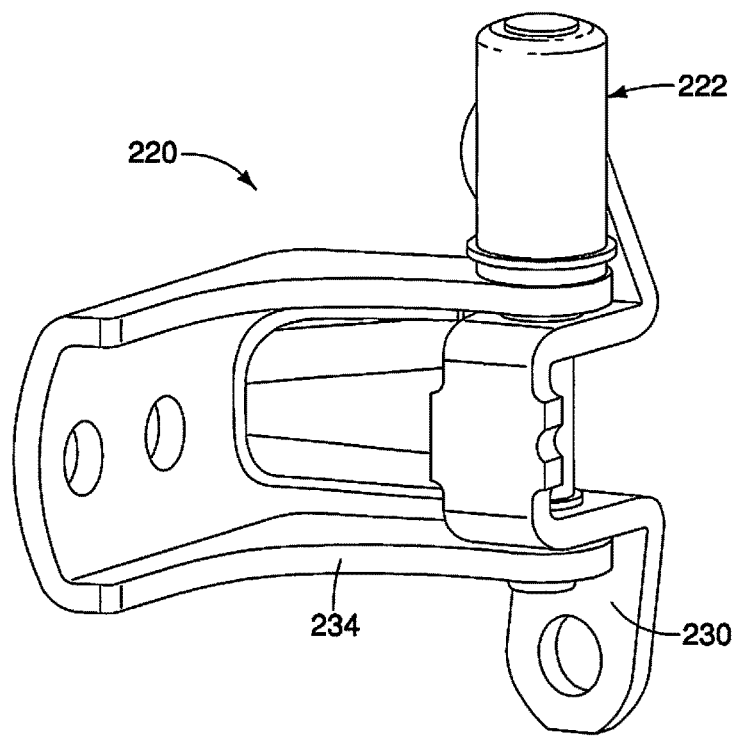
FIG. 43 is a perspective view of a hinge structure having a body bracket and a door bracket pivotally connected to one another with the hydraulic check structure attached to the body bracket in accordance with an eighth embodiment.

Referring now to FIG. 43, a hinge structure 220 in accordance with an eighth embodiment will now be explained. In view of the similarity between the first and eighth embodiments, the parts of the eighth embodiment that are identical to the parts of the first embodiment will be given the same reference numerals as the parts of the first embodiment. Moreover, the descriptions of the parts of the eighth embodiment that are identical to the parts of the first embodiment may be omitted for the sake of brevity.

The hinge structure 220 includes a first bracket 230 and a hinge arm 234 that includes an integrally formed second bracket. One of the first bracket 230 and the second bracket is a door bracket and the other is a body bracket. The hinge arm 234 pivots relative to the first bracket 230. The check structure 222 (the hydraulic check structure of the seventh embodiment) is installed to the hinge structure 220 along an upper portion of the hinge arm 234. The case 250 of the check structure 222 is non-movably fixed to the hinge arm 234. The shaft 252 and paddle 252a of the check structure 222 are fixed to the pivot pin (not shown) of the hinge structure 220 for pivoting movement with the first bracket 230. Operation of the check structure 222 is identical to that described above with respect to the seventh embodiment, except that the overall pivoting range of the check structure 222 is adjusted to the overall pivoting range of the hinge structure 220, which can be, for example, anywhere between 60 degrees up to 120 degrees or any angle therebetween.

Nine Embodiment

Figure 44:
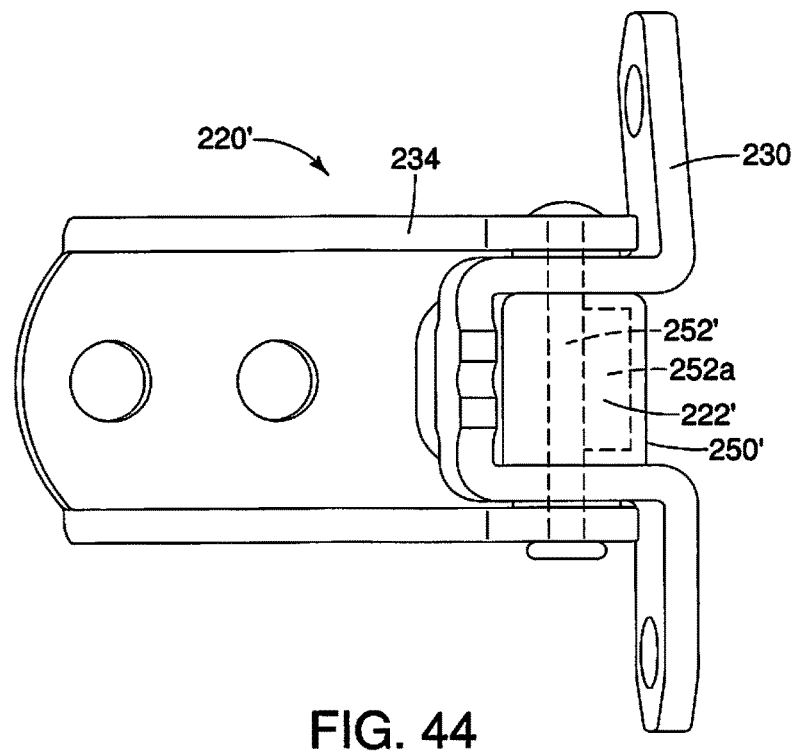
FIG. 44 is a perspective view of a hinge structure having a body bracket and a door bracket pivotally connected to one another with the hydraulic check structure attached to the body bracket in accordance with a ninth embodiment.

Referring now to FIG. 44, a hinge structure 220' in accordance with an ninth embodiment will now be explained. In view of the similarity between the above described embodiments and ninth embodiments, the parts of the ninth embodiment that are identical to the parts of the above described embodiments will be given the same reference numerals as the parts of the above described embodiments. Moreover, the descriptions of the parts of the ninth embodiment that are identical to the parts of the above described embodiments may be omitted for the sake of brevity. The parts of the ninth embodiment that differ from the parts of the above described embodiments will be indicated with a single prime (').

The hinge structure 220' is identical to the hinge structure 220 of the eighth embodiment except that the location of the check structure 222 has changed. The hinge structure 220' includes the first bracket 230 and the hinge arm 234 of the eighth embodiment. However, the check structure 222' (the hydraulic check structure) is installed to the hinge structure 220' between upper and lower plates of the first bracket 230. The case 250' of the check structure 222' is non-movably fixed to one or both of the upper plate and the lower plate of the first bracket 230. The shaft 252 and paddle 252a of the check structure 222 are fixed to the pivot pin (not shown) of the hinge structure 220' for pivoting movement with the hinge arm 234. Operation of the check structure 222' is identical to that described above.

The various vehicle parts and structural elements are conventional components that are well known in the art. Since vehicle parts and elements are well known in the art, these structures will not be discussed or illustrated in detail herein. Rather, it will be apparent to those skilled in the art from this disclosure that the components can be any type of structure and/or programming that can be used to carry out the present invention.

General Interpretation Of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle door check structure. Accordingly, these terms, as utilized to describe the present invention should be interpreted relative to a vehicle equipped with the vehicle door check structure.

The term "configured" as used herein to describe a component, section or part of a device includes mechanical features constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle door hinge structure comprising:
a first bracket having a first surface that extends in a first direction and a stop surface extending in a second direction transverse to the first direction;
a hinge arm having a first end, a second end and a body portion extending from the first end to the second end, the first end being attached to the first bracket for pivoting movement about a first pivot axis that extends through the first surface of the first bracket such that the hinge arm pivots relative to the first bracket from a first position to a second position, the body portion of the hinge arm having a movement limiting surface that is spaced apart from the first surface by a first predetermined distance;
a second bracket attached to the second end of the hinge arm for pivoting movement about a second pivot axis that extends through the second bracket and the second end of the hinge arm, the second bracket pivoting relative to the second end of the hinge arm; and
a compressible check structure fixed in position along a portion of the first surface of the first bracket, the compressible check structure being adjacent to and spaced apart from the stop surface of the first bracket, the compressible check structure extending away from the first surface in an uncompressed state by a second predetermined distance that is greater than the first predetermined distance, the movement limiting surface of the hinge arm contacting and compressing the compressible check structure during a portion of movement of the hinge arm between the first position and the second position.

2. The vehicle door hinge structure according to claim 1, wherein
the compressible check structure is made of an elastic material such that contact between the compressible check structure and the movement limiting surface of the hinge arm during movement of the hinge arm between the first position and the second position generates friction therebetween.

3. The vehicle door hinge structure according to claim 1, wherein
the compressible check structure is spaced apart from the stop surface of the first bracket such that a gap is defined between the stop surface and the compressible check structure, and with the movement limiting surface of the hinge arm being disposed within the gap, the hinge arm is in the second position.

4. The vehicle door hinge structure according to claim 3, wherein
the gap has a first overall length measured from the edge of the compressible check structure to the stop surface, and
the movement limiting surface of the hinge arm has a first width measured in a widthwise direction of the hinge arm, the first overall length and the first width being approximately equal.

5. The vehicle door hinge structure according to claim 1, wherein
the first surface of the first bracket defines an aperture that extends from the first surface to a second surface of the first bracket opposite the first surface, and
the compressible check structure includes a main body, a compressible portion located at a first end of the main body, and a retention portion located at a second end of the main body, the main body of the compressible check structure extending through the aperture of the first bracket, the compressible portion being located along the first surface of the first bracket surrounding the aperture and the retention portion facing the second side of the first bracket.

6. The vehicle door hinge structure according to claim 5, wherein
the main body of the compressible check structure has a rectangular cross-section, and the aperture of the first bracket has a corresponding rectangular shape, the main body and the aperture being dimensioned to prevent rotation of the compressible check structure with the main body inserted into the aperture.

7. The vehicle door hinge structure according to claim 6, wherein
the main body of the compressible check structure has a first side surface and a second side surface substantially parallel to one another, a third side surface and a fourth side surface substantially parallel to one another and perpendicular to the first and the second side surfaces, and
the retention portion of the compressible check structure includes a first compressible flange and a second compressible flange, the first and the second compressible flanges extending from the second end of the main body of the compressible check structure toward the first end of the main body, with respective distal ends of the first and the second compressible flanges facing the second side of the first bracket with the main body inserted into the aperture preventing the retention portion from passing through the aperture from the second side of the first bracket to the first side of the first bracket.

8. The vehicle door hinge structure according to claim 7, wherein
the first compressible flange extends adjacent to the first side surface of the main body and the second compressible flange extends adjacent to the second side surface, a lengthwise extending surface of the first compressible flange and the first side surface of the main body defining an acute angle therebetween and a lengthwise extending surface of the second compressible flange and the second side surface of the main body defining an acute angle therebetween.

9. The vehicle door hinge structure according to claim 5, wherein
the compressible portion has a base that is wider than a width of the aperture and is located adjacent the first side of the first bracket with the main body inserted into the aperture.

10. The vehicle door hinge structure according to claim 1, wherein
at least a portion of a first side of the hinge arm faces the stop surface of the first bracket.

11. The vehicle door hinge structure according to claim 1, wherein
the hinge arm comprises a first gooseneck member and a second gooseneck member, the first gooseneck member defining the first end and the second end of the hinge arm,
the second gooseneck member having a first end and a second end, the first end being attached to the first bracket for pivotal movement about a third pivot axis that extends through the first surface of the first bracket such that the second gooseneck member pivots about the third pivot axis relative to the first bracket from a first position to a second position, and the second bracket is attached to the second end of the second gooseneck member for pivotal movement about a fourth pivot axis that extends through the second bracket, the second bracket pivoting about the fourth pivot axis relative to the second end of the second gooseneck member, the first pivot axis and the third pivot axis being spaced apart from one another and parallel to one another, and the second pivot axis and the fourth pivot axis being spaced apart from one another and parallel to one another.

12. The vehicle door hinge structure according to claim 1, wherein
the first bracket is a body bracket configured to attach to a vehicle body structure and the second bracket is a door bracket configured to attach to a vehicle door.

13. A vehicle comprising:
a body structure defining a door opening;
a door bracket rigidly attached to the body structure and having a first surface that extends in a first direction and a stop surface extending in a second direction transverse to the first direction;
a hinge arm having a first end, a second end and a body portion extending from the first end to the second end, the first end being attached to the first bracket for pivoting movement about a first pivot axis that extends through the first surface of the door bracket such that the hinge arm pivots relative to the door bracket from a first position to a second position, the body portion of the hinge arm having a movement limiting surface that is spaced apart from the first surface by a first predetermined distance;
a door attached to the second end of the hinge arm for pivoting movement about a second pivot axis that extends through the door and the second end of the hinge arm, the door pivoting relative to the second end of the hinge arm from a closed position covering the door opening to an open position exposing the door opening; and
a compressible check structure fixed in position along a portion of the first surface of the door bracket, the compressible check structure being adjacent to and spaced apart from the stop surface of the door bracket, the compressible check structure extending away from the first surface in an uncompressed state by a second predetermined distance that is greater than the first predetermined distance, the movement limiting surface of the hinge arm contacting and compressing the compressible check structure during a portion of movement of the hinge arm between the first position and the second position.

14. The vehicle door hinge structure according to claim 13, wherein
the compressible check structure is made of an elastic material such that contact between the compressible check structure and the movement limiting surface of the hinge arm during movement of the hinge arm between the first position and the second position generates friction therebetween.

15. The vehicle door hinge structure according to claim 13, wherein
the compressible check structure is spaced apart from the stop surface of the door bracket such that a gap is defined between the stop surface and the compressible check structure, and with the movement limiting surface of the hinge arm being disposed within the gap, the hinge arm is in the second position.

16. The vehicle door hinge structure according to claim 15, wherein
the gap has a first overall length measured from the edge of the compressible check structure to the stop surface, and
the movement limiting surface of the hinge arm has a first width measured in a widthwise direction of the hinge arm, the first overall length and the first width being approximately equal.

17. The vehicle door hinge structure according to claim 14, wherein
the first surface of the door bracket defines a aperture that extends from the first surface to a second surface of the door bracket opposite the first surface, and
the compressible check structure includes a main body, a compressible portion located at a first end of the main body, and a retention portion located at a second end of the main body, the main body extending through the aperture of the door bracket, the compressible portion being located along the first surface of the door bracket surrounding the aperture and the retention portion being positioned on the second side of the hinge arm.

18. The vehicle door hinge structure according to claim 17, wherein
the main body of the compressible check structure has a rectangular cross-section, and the aperture of the door bracket has a corresponding rectangular shape, the main body and the aperture being dimensioned to prevent rotation of the compressible check structure with the main body inserted into the aperture, and
the retention portion includes a plurality of snap-fitting flanges that engage the second surface of the door bracket with the main body inserted into the aperture.

19. The vehicle door hinge structure according to claim 13, wherein
the hinge arm comprises a first gooseneck member and a second gooseneck member, the first gooseneck member defining the first end and the second end of the hinge arm,
the second gooseneck member having a first end and a second end, the first end being attached to the door bracket for pivotal movement about a third pivot axis that extends through the first surface of the door bracket such that the second gooseneck member pivots about the third pivot axis relative to the door bracket from a first position to a second position, and
the door is attached to the second end of the second gooseneck member for pivotal movement about a fourth pivot axis, the door pivoting about the fourth axis relative to the second end of the second gooseneck member from the closed position to the open position.

20. The vehicle door hinge structure according to claim 13, wherein
the first pivot axis and the third axis are spaced apart from one another and are parallel to one another, and the second pivot axis and the fourth pivot axis are spaced apart from one another and are parallel to one another.

* * * * *